(12) United States Patent
Walz

(10) Patent No.: US 11,786,082 B2
(45) Date of Patent: Oct. 17, 2023

(54) RE-USABLE SENSOR MODULE FOR USE WITH A DISPENSER OF A HAND HYGIENE PRODUCT

(71) Applicant: GWA HYGIENE GMBH, Stralsund (DE)

(72) Inventor: Marcel Walz, Stralsund (DE)

(73) Assignee: GWA HYGIENE GMBH, Stralsund (DE)

(*) Notice: Subject to any disclaimer, the term of this patent is extended or adjusted under 35 U.S.C. 154(b) by 52 days.

(21) Appl. No.: 16/973,505

(22) PCT Filed: Jun. 11, 2019

(86) PCT No.: PCT/EP2019/065249
§ 371 (c)(1),
(2) Date: Dec. 9, 2020

(87) PCT Pub. No.: WO2019/238706
PCT Pub. Date: Dec. 19, 2019

(65) Prior Publication Data
US 2021/0244239 A1    Aug. 12, 2021

(30) Foreign Application Priority Data
Jun. 11, 2018   (EP) ..................................... 18177116

(51) Int. Cl.
*A47K 5/12*      (2006.01)
*G01F 23/20*    (2006.01)
(Continued)

(52) U.S. Cl.
CPC .......... *A47K 5/1217* (2013.01); *A47K 5/1205* (2013.01); *G01F 23/20* (2013.01);
(Continued)

(58) Field of Classification Search
CPC ...... A47K 5/12; A47K 5/1217; A47K 5/1205; A47K 5/1207; G01F 11/025; G01F 23/20; G01F 23/2928; G01G 21/22; G08B 21/245
(Continued)

(56) References Cited

U.S. PATENT DOCUMENTS 6,315,163 B1 *  11/2001  Shu ..................... B05B 11/0037
                                                               222/39
6,349,851 B1 *   2/2002  Lu ....................... B05B 11/0005
                                                               222/39
(Continued)

FOREIGN PATENT DOCUMENTS

AU    2014227493 A1    4/2015
CA       1173069 A     8/1984
(Continued)

OTHER PUBLICATIONS

Applicant: GWA Hygiene GmbH; PCT International Application No. PCT/EP2019/065249, International Filing Date: Jun. 11, 2019; "Re-Usable Sensor Module for Use with a Dispenser of a Hand Hygiene Product"; International Search Report and Written Opinion; Authorized Officer: Alan Fordham; dated Oct. 2, 2019; 16 pgs.
(Continued)

*Primary Examiner* — Charles P. Cheyney
(74) *Attorney, Agent, or Firm* — TAROLLI, SUNDHEIM, COVELL & TUMMINO L.L.P.

(57) ABSTRACT

A re-usable sensor module for use with a dispenser for a hand hygiene product is described, wherein the dispenser comprises a container. The sensor module comprises an elastically deformable capsule with a top portion for placing a bottom of the container thereon. A sensor is arranged within the capsule and configured to measure a parameter associated with an elastic deformation of the capsule resulting from actuation or presence of the dispenser. The sensor
(Continued)

module further comprises a processor arranged within the capsule and coupled to the sensor. The processor is configured to at least temporarily record at least one of the parameter and an event associated therewith.

20 Claims, 14 Drawing Sheets

(51) Int. Cl.
*G01F 23/292* (2006.01)
*G01G 21/22* (2006.01)
*G08B 5/38* (2006.01)
*G08B 21/24* (2006.01)

(52) U.S. Cl.
CPC ......... *G01F 23/2928* (2013.01); *G01G 21/22* (2013.01); *G08B 5/38* (2013.01); *G08B 21/245* (2013.01)

(58) Field of Classification Search
USPC ..................................................... 222/25, 23
See application file for complete search history.

(56) References Cited

U.S. PATENT DOCUMENTS

| | | | | |
|---|---|---|---|---|
| 7,315,245 | B2* | 1/2008 | Lynn | G09B 19/0076 340/573.1 |
| 7,477,148 | B2* | 1/2009 | Lynn | A47K 5/1202 340/573.1 |
| 7,782,214 | B1* | 8/2010 | Lynn | A47K 5/1217 340/572.1 |
| 8,618,448 | B2* | 12/2013 | Alexander | H02J 50/12 165/61 |
| 10,039,423 | B2* | 8/2018 | Schultz | A47K 5/12 |
| 10,234,131 | B2* | 3/2019 | Lee | A47G 23/0309 |
| 10,573,161 | B2* | 2/2020 | Engelhard | A61J 7/0418 |
| 2001/0054626 | A1 | 12/2001 | Bethune et al. | |
| 2002/0100676 | A1 | 8/2002 | Janniere | |
| 2008/0019489 | A1* | 1/2008 | Lynn | G06Q 30/02 379/93.01 |
| 2008/0019490 | A1 | 1/2008 | Lynn | |
| 2009/0166378 | A1 | 7/2009 | Stilley | |
| 2011/0180564 | A1* | 7/2011 | Jones | G09B 19/0076 222/113 |
| 2012/0274468 | A1 | 11/2012 | Wegelin et al. | |
| 2013/0098941 | A1* | 4/2013 | Wegelin | A47K 5/1217 222/23 |
| 2014/0311239 | A1 | 10/2014 | Marjanovic | |
| 2015/0061867 | A1 | 3/2015 | Engelhard | |
| 2015/0223646 | A1* | 8/2015 | Wegelin | A47K 5/1211 222/64 |
| 2017/0018166 | A1* | 1/2017 | Johnson | G08B 21/18 |
| 2017/0059432 | A1 | 3/2017 | Chang | |
| 2019/0314843 | A1* | 10/2019 | Nour-Omid | B05B 12/081 |
| 2021/0205864 | A1* | 7/2021 | Xing | B08B 3/08 |

FOREIGN PATENT DOCUMENTS

| | | |
|---|---|---|
| CN | 106482889 A | 3/2017 |
| CN | 107976266 A | 5/2018 |
| DE | 202006012755 U1 | 5/2007 |
| IN | 2303/DEL/2009 | 1/2016 |
| WO | 2004101122 A2 | 11/2004 |
| WO | 2012064515 A2 | 5/2012 |
| WO | 2012150563 A1 | 11/2012 |
| WO | 2013003661 A1 | 1/2013 |
| WO | 2015017702 A2 | 2/2015 |
| WO | 2017200965 A1 | 11/2017 |
| WO | 2018100353 A1 | 6/2018 |
| WO | 2018165107 A1 | 9/2018 |

OTHER PUBLICATIONS

Zuxing Ouyang, "Fundamentals of Machine Design"; Aviation Industry Press, Sep. 30, 1992; p. 179.
Chenglin Peng, Principles and Applications of Biomedical Sensors; Higher Education Press, Jun. 30, 2000, p. 166.
Applicant: GWA Hygiene GmbH; "Re-Usable Sensor Module for use with a Dispenser of a Handy Hygiene Product"; Chinese Office Action dated Jan. 6, 2022, 11 pgs.
Applicant: GWA Hygiene GmbH; "A Dispensing System for a Hand Hygiene Product Comprising a Re-Usable Sensor Module"; European Application No. 18177116.3; (EP Patent No. EP3581897); Jun. 21, 2021; Notice of Opposition; 44 pgs.
Applicant: GWA Hygiene GmbH; European Application No. 18177116.3; Office Action (letter from Opponent of Nov. 21, 2022) dated Nov. 25, 2022; 28 pgs.
Applicant: GWA Hygiene GmbH; European Application No. 20195969.9; European Office Action (Communication pursuant to Article 94(3) EPC) dated Mar. 9, 2023; 5 pgs.
Applicant: GWA Hygiene GmbH; European Application No. 18177116.3; Office Action (Oral Proceedings) dated Jan. 27, 2023; 10 pgs.
Wayback Machine excerpt of eSupplies Medical offer for sale of wall mountable HiBi Scrub Metal Dispenser Cage for 600ml pump bottle; Capture dates: Aug. 2016 and Mar. 2017; 3 Pgs.

* cited by examiner

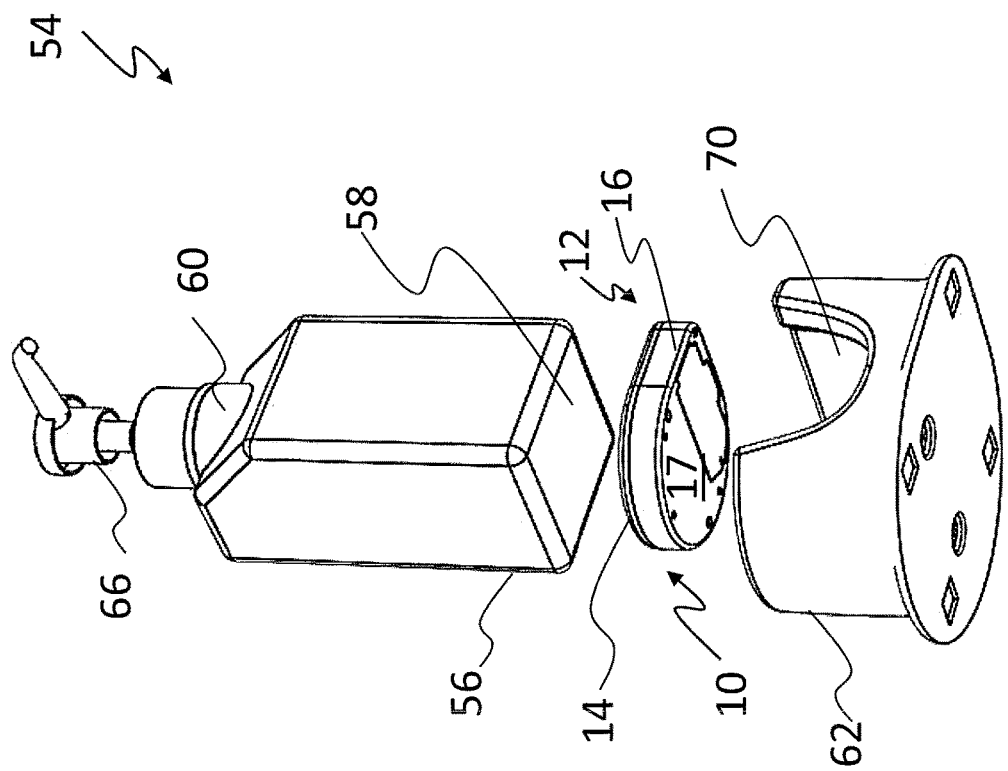
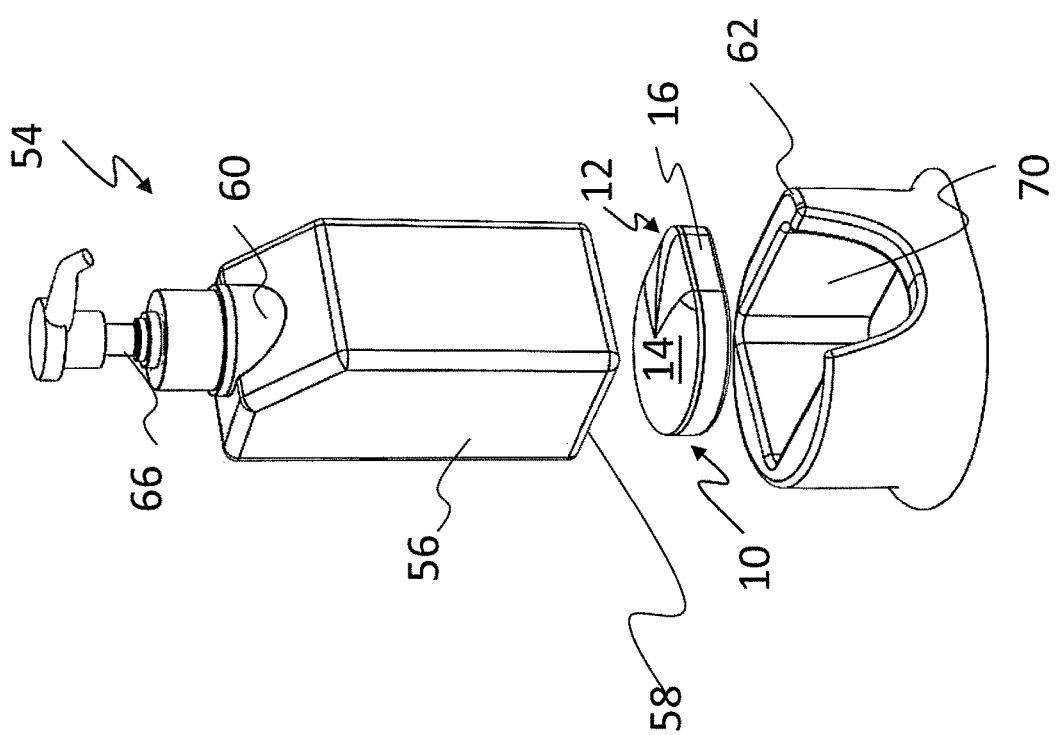

| No. | Timestamp | Operation Event Type | Initial Voltage | Force Sensor Peak Voltage Change | Event Duration | Movement | Orientation | Closest Frame of Reference | Optical Sensor | Battery Voltage |
|---|---|---|---|---|---|---|---|---|---|---|
| 1 | 00.00.0000 13:44:43,500 | Actuation | 200mV | 1400mV | 200ms | 1,01 G | UP | 1A:BB:CC:DD:EE:FF | 10mV | 2800mV |
| 2 | 04.05.2018 14:00:05,100 | Actuation | 150mV | 1350mV | 180ms | 1,25G | UP | 1A:BB:CC:DD:EE:FF | 200mV | 2790mV |
| 3 | 05.05.2018 12:04:45,300 | Bottle Removed | 0mV | 0mV | 110ms | 2G | UP | 3A:BB:CC:DD:EE:FF | 2760mV | 2760mV |
| 4 | 07.05.2018 11:40:45,300 | Free Fall Detected | 0mV | 2700mV | 100ms | 0 G | DOWN | 2A:BB:CC:DD:EE:FF | 0mV | 2750mV |
| 5 | 07.05.2018 11:40:45,200 | Bottle Inserted | 300mV | 600mV | 120ms | 2 G | UP | 1A:BB:CC:DD:EE:FF | 10mV | 2750mV |

Fig. 12

RE-USABLE SENSOR MODULE FOR USE WITH A DISPENSER OF A HAND HYGIENE PRODUCT

CROSS-REFERENCE TO RELATED APPLICATIONS

This application is a U.S. National Stage Application filed under 35 U.S.C. § 371 of PCT/EP2019/065249, filed Jun. 11, 2019, and entitled RE-USABLE SENSOR MODULE FOR USE WITH A DISPENSER OF A HAND HYGIENE PRODUCT, which International Application claims the benefit of priority from European Patent Application No. 18177116.3, filed on Jun. 11, 2018. The entire contents of each of the above-identified patent applications are incorporated herein by reference.

TECHNICAL FIELD

The present disclosure relates to the field of dispensers for hand hygiene products. In particular, a sensor module for monitoring the use of a dispenser for a hand hygiene product and a system comprising the sensor module and the dispenser are presented.

BACKGROUND

In recent years, there has been a rise in the number of new infections incurred inside hospitals. Especially patients are affected by this phenomenon. The main cause for these new infections is suspected to be an incorrect or improper use of hand hygiene products, such as fluid disinfectants, also due to the rising workload of the employees of the hospitals.

A suitable countermeasure could be a comprehensive electronic recording of the usage of hand hygiene products. However, until now, such an approach is not possible for some kinds of dispensers. For example, the monitoring of a disinfectant dispenser mounted to a patient's bed via a separate holder is at best inaccurate. Furthermore, it is also difficult to check if a prescribed amount of a hand hygiene product is used by every single employee before and after treating a patient.

A solution to overcome the above stated problems known in the prior art is disclosed in US 2012/0218106 A1. In this document, a dispenser assembly including a body-worn fluid dispenser is described. The fluid dispenser comprises a main housing forming a cavity, in which a fluid container is disposed. A dispensing sensor integrated into the main housing is configured to collect data related to dispensing events of the fluid dispenser. However, as the dispensing sensor is integrated into the housing, there is no possibility of using this fluid dispenser with different kinds of containers for hand hygiene products, such as stand-alone containers or containers mounted to a patient's bed or containers having arbitrary dimensions.

SUMMARY

There is a need for a sensor module that can be used with different kinds of dispensers for hand hygiene products and that is easy to use.

According to one aspect, a re-usable sensor module for use with a dispenser for a hand hygiene product is provided. The dispenser has a container and the sensor module comprises an elastically deformable capsule with a top portion for placing a bottom of the container thereon. The sensor module further comprises a first sensor arranged within the capsule and configured to measure a parameter associated with an elastic deformation of the capsule resulting from actuation or presence of the dispenser. A processor is arranged within the capsule and coupled to the first sensor, wherein the processor is configured to at least temporarily record at least one of the parameter and an event associated therewith.

The dispenser may be a fluid dispenser, such as a dispenser for disinfectants. The fluid dispenser may comprise a manually actuatable pump or any other manually operable fluid dispensing mechanism. Alternatively, the dispenser may be a dispenser for individually removable hand hygiene products, such as tissues, towels or gloves. In this case, the dispenser is actuated by manually removing the tissues, towels, gloves or other items from the container. The dispenser may also be a dispenser that detects the presence of a user and automatically dispenses a non-fluid or fluid hand hygiene product, for example using a motor-operated pumping mechanism.

The sensor module may be an independent element that can separately be handled. The sensor module is re-usable, meaning that it can repeatedly be used with the same or with different kinds of dispensers. The dispensers, in turn, may not be re-usable or may be re-usable also.

The elastically deformable capsule may be configured such that it has an initial undeformed state to which it can return after deformation. Alternatively, the capsule may be configured to have an initial predefined deformed state. The capsule can thus either be further deformed into one direction or may be deformed in the opposite direction, such that the capsule reaches an undeformed state. In this manner, strain and pressure can be detected independently. The capsule may comprise a top portion and a lower portion, defining a space between them. In one variant, only the top portion is elastically deformable, whereas the lower portion is made of a rigid material. In another variant, the top portion and the lower portion are made of a rigid material and are coupled to each other via an elastically deformable coupling element. The capsule is then elastically deformed by deforming the coupling element instead of or in addition to the top portion of the capsule.

The capsule may be sealed against liquids and/or dust. The sealing may not interfere with elastic deformability of the capsule. Additionally, the sealing may constitute the elastically deformable coupling element that is configured to couple the top portion and the lower portion to one another. The sealing may be made from an elastomeric material.

The sealing may be transparent to permit the transmission of optical signals generated within the sensor module through the sealing. The optical signals may be generated by a light-emitting element under the control of the processor. The light-emitting element may be a light-bar comprising a plurality of LEDs. The light-emitting element may be arranged around the entire circumference of the sensor module. The light-emitting element may be configured to provide visual feedback to a user regarding the use of the sensor module.

The capsule may be provided with buttons and/or a display device. The buttons and the display device may be realized as individual elements or may alternatively be combined in a touch-sensitive panel.

The first sensor may be arranged within the capsule. As an example, the first sensor may be located adjacent to an inner surface of the top portion. Alternatively or additionally, the first sensor may be in direct contact with an inner surface of the top portion. Placing the bottom of the container on the top portion may lead to an elastic deformation of said top portion. The first sensor may be configured to measure a parameter associated with such an elastic deformation of the top portion of the capsule.

The processor may be mounted on a first circuit board, to which also the first sensor may be mounted. The processor may alternatively be mounted to a second circuit board different from a first circuit board on which the first sensor is mounted, wherein the first circuit board and the second circuit board are arranged within the capsule. However, the present disclosure is not limited thereto. The sensor module may thus comprise three or more circuit boards.

The processor may be configured to record the parameter and/or the associated event over a given time period and may optionally be configured to create one or more datasets comprising the recorded data. The processor may be coupled to a memory storing the recorded dataset.

In some variants, the top portion of the capsule may be made from an elastically deformable material to deform under a force and return to an initial undeformed state after the force is removed. The top portion of the sensor module may be made of an elastic polymer, elastic fibres or fabrics. Alternatively, a first portion of the top portion of the sensor module may be made from an elastically deformable material and a second portion of the top portion of the sensor module be made of a rigid material. Still further, the top portion may be made of a rigid material if a deformable coupling element is provided, as explained above.

Additionally, the top portion may be dome-shaped (for example may have a convex cross-section) and may comprise a mechanic link. The mechanic link may be in the form of a protrusion extending from an inner surface of the top portion towards the first sensor. The top portion may further be configured to be in contact or to be brought into contact with the first sensor via the mechanic link. The lower portion of the capsule may also be dome-shaped or planar.

In some variants, the mechanic link may be configured to move towards the first sensor when the top portion is elastically deformed.

The sensor module may further comprise a fastening member. The fastening member may be configured to detachably fasten the sensor module to one of the dispenser and a holder for the dispenser. The fastening member may for example comprise a clamping mechanism. The clamping mechanism may be manually adjustable, for example by a screw or lever.

The fastening member may comprise at least one of a spring-loaded element, a snap-lock connection, a clip connection, or a combination thereof.

The fastening member may be detachable from the sensor module. The lower portion of the capsule may have a planar bottom surface for properly aligning the sensor module relative to the holder on which it is placed.

The first sensor may be one of a force sensor (e.g., a weight sensor), a pressure sensor and a mechanical switch (e.g., to open and close an electrical circuit).

The measured parameter may be representative of a weight of the dispenser and/or the event may be representative of an actuation of the dispenser. The processor may be configured to determine, based on the measured parameter, at least one of a current filling level of the dispenser and an exchange of the dispenser.

The processor may be configured to repeatedly acquire the parameter at predefined points in time and/or at configured thresholds and/or the processor may be coupled to a light-emitting element. The configured thresholds may depend on the elastic deformation of the capsule and/or may depend on the specific kind of dispenser. Configured thresholds may be an exchange of an empty container and/or attaining the expected expiry date of the content of the container.

The sensor module may further comprise a second sensor. The second sensor may be configured to detect at least one of a movement and a position of the sensor module. For example, the second sensor may be configured to detect a change in the orientation and/or velocity of the sensor module. The second sensor may be one of an acceleration sensor, a compass, a gyroscope, a sensor of a satellite-based positioning system and a sensor of a radio-based positioning system.

The sensor module may further comprise a third sensor. The third sensor may be an optical sensor configured to detect at least one of a current filling level of the dispenser and an exchange of the dispenser. The optical sensor may be an IR sensor or a sensor operating based on visible light. The optical sensor may be arranged on the top portion of the capsule and face the container.

The sensor module may further comprise a radio transmitter configured to transmit at least one of the parameter and the event associated therewith to a base station. Said transmission may be performed directly from the sensor module to the base station. In an alternative embodiment, the transmission may be performed via an additional transceiver (that may also be configured as a passive transponder), such as a transceiver attached to the clothes of a user operating the dispenser. In still another embodiment, a first sensor module may transmit the parameter and/or the associated event to a second sensor module to which it is radio-connected. The second sensor module may optionally transmit the parameter and/or the associated event to a third sensor module to which it is radio-connected. This transmission chain may continue until a last sensor module transmits the parameter and/or the associated event to a base station ("bridging architecture"). The radio transmitter may have a transmitting frequency of 2.4 GHz. The radio transmitter may be a Bluetooth Low Energy (BLE) transmitter. The radio transmitter may be part of a radio transceiver configured to also receive signals.

According to a second aspect, a dispensing system is provided. The system comprises the sensor module and a container as presented herein. The container has a bottom configured to rest on the sensor module and a dispensing opening located opposite to the bottom.

The dispensing opening may be configured to dispense a hand hygiene product from the container to the outside. The dispensing system may be operated by a pump mechanism, comprising a pumping head with a dispensing tube and a mounting portion attachable to the dispensing opening of the container. The dispensing opening may alternatively be closed by a semi-permeable element, such as a plastic foil with a central slit or overlapping layers of paper, to manually remove individual hand hygiene products, such as gloves, through the semi-permeable element.

The system may further comprise a holder that is configured to accommodate the container. The sensor module may be sandwiched between the holder and the bottom of the container. The sensor module may be detachably mounted to the holder by the fastening member as described herein. The fastening member may be detachable from the sensor module.

The holder may for example be a frame that is mountable to a patient's bed or to a wall. The holder may further be a stand-alone element that can be placed on a table or a working surface. The stand-alone element may have a cavity in which the sensor module and the container can be placed.

In another embodiment, the holder may comprise a fastening mechanism configured to attach the holder to the clothes of a user.

The system may further comprise a fluid dispenser for a hand hygiene product, the fluid dispenser comprising the container and a manually actuatable pump, wherein the fluid dispenser is configured so that an actuation of the pump produces a force on the top portion of the sensor module in addition to a weight of the container. In such an implementation, the first sensor may be configured to measure a parameter associated with an elastic deformation of the capsule resulting from the actuation of the pump.

Also provided is a method of operating are-usable sensor module for use with a dispenser for a hand hygiene product having a container, the sensor module comprising an elastically deformable capsule with a top portion for placing a bottom of the container thereon, the method comprising measuring a parameter associated with an elastic deformation of the capsule resulting from actuation of the dispenser or presence of the container, and at least temporarily recording at least one of the parameter and an event associated therewith.

The recorded parameter may comprises one or more of a voltage indicative of a presence of the container, a peak voltage associated with actuation of the dispenser, and a duration of actuation of the dispenser.

Also provided is a computer program product configured to perform the steps of any of the method aspects disclosed herein when executed by a processor.

According to further aspect, a method of operating a re-usable sensor module for use with a dispenser for a hand hygiene product is provided, wherein the dispenser has a container and the sensor module comprises an elastically deformable capsule with a top portion for placing a bottom of the container thereon. The sensor module further comprises a first sensor arranged within the capsule and configured to measure a parameter associated with an elastic deformation of the capsule resulting from actuation or presence of the dispenser. A processor is arranged within the capsule and coupled to the first sensor, wherein the method comprises at least temporarily recording at least one of the parameter and an event associated therewith. Also provided is a computer program product comprising program code portions for performing the method.

In another embodiment, the parameter and/or the associated event may be transmitted to a radio transceiver and may temporarily be stored thereon. The stored data may then be transmitted to a base station at a suitable point in time.

BRIEF DESCRIPTION OF THE DRAWINGS

Further details, advantages and aspects of the present disclosure will become apparent from the following embodiments taken in conjunction with the drawings, wherein:

FIG. 6A shows a front view of a second embodiment of the dispensing system;

FIG. 6B shows a bottom view of the second embodiment of the dispensing system;

FIG. 12 shows exemplary datasets created by a processor of the sensor module and being indicative of dispensing events of a dispenser for a hand hygiene product.

DETAILED DESCRIPTION

Figure 1:
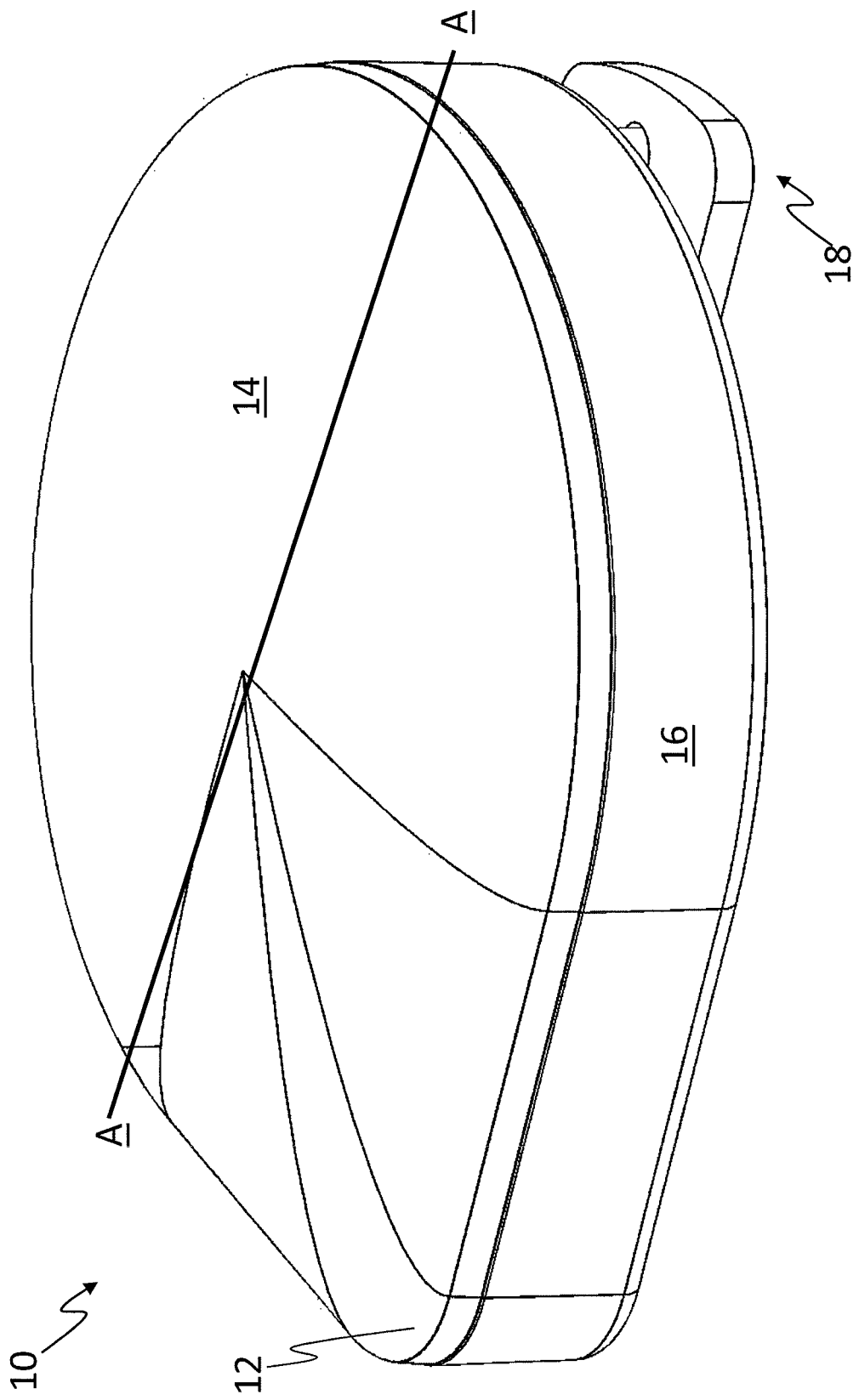
FIG. 1 shows a perspective top view of an embodiment of a sensor module with a fastening member.

In the following description, exemplary embodiments of a re-usable sensor module for use with a dispenser for a hand hygiene product and a dispensing system for hand hygiene products will be explained with reference to the drawings. The same or similar reference numerals will be used to denote the same or similar structural features.

FIG. 1 shows a perspective top view of a first embodiment of a sensor module 10. The sensor module 10 comprises an elastically deformable capsule 12 with a top portion 14 and a lower portion 16. The sensor module 10 also comprises a fastening member 18 for fastening the sensor module 10 to a holder (not shown) for a dispenser (also not shown).

In the present embodiment, the top portion 14 of the sensor module 10 is dome-shaped, meaning that the top portion 14 has a convex cross-section. This configuration of the top portion 14 distributes a force acting on the top portion 14 from different angles uniformly across the surface of the top portion 14.

The top portion 14 is made from an elastically deformable material, such as an elastic polymer. Therefore, the top portion 14 will deform under a force (e.g., a weight) acting thereon and will return to an initial undeformed state after the force is removed. The lower portion 16 of the capsule 12 is made of a rigid material, such as metal or an inelastic polymer. This will improve the stability of the capsule 12 and extend its durability. Alternatively or additionally, the lower portion 16 may also be dome-shaped and/or be made of an elastically deformable material.

In another embodiment, the top portion 14 and the lower portion 16 may both be made of a rigid material and may be movable relative to each other under compression of an elastically deformable coupling element, such as a spring element, arranged therebetween. The capsule 12 may then be elastically deformed by deforming the coupling element.

Figure 2B:
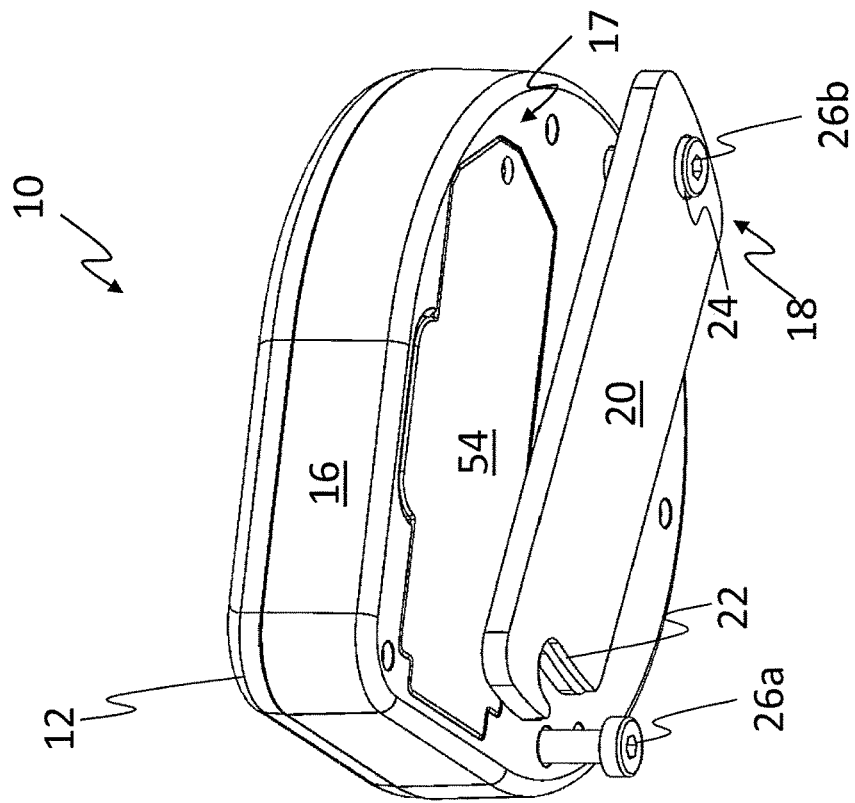
FIG. 2B shows a perspective bottom view of the sensor module of FIG. 1 with an open fastening member.
Figure 2A:
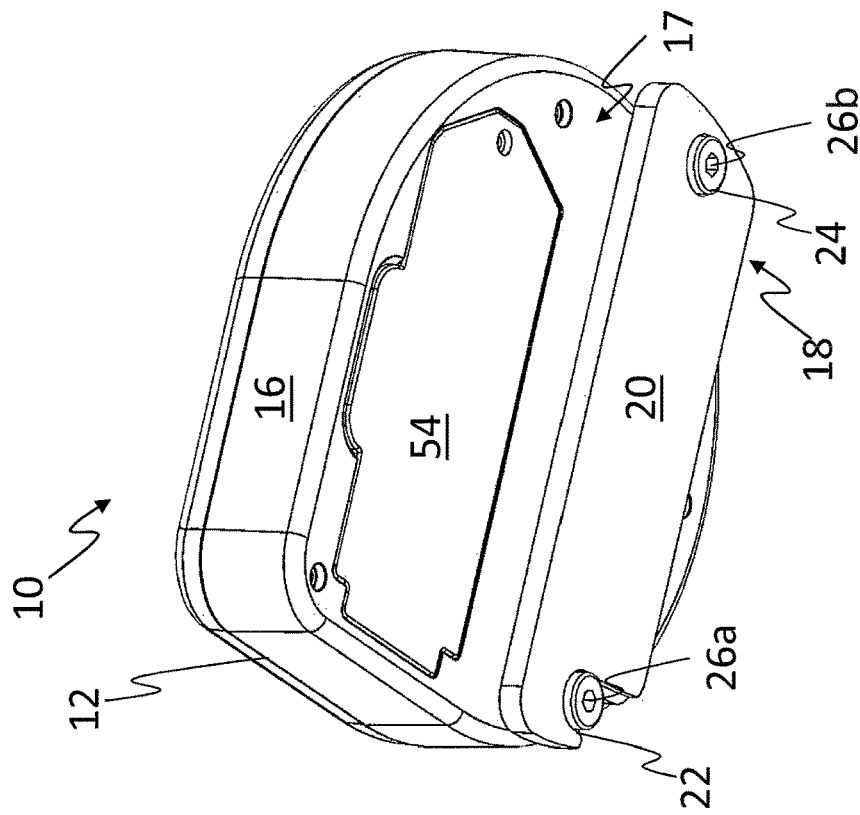
FIG. 2A shows a perspective bottom view of the sensor module of FIG. 1 with a closed fastening member.

FIGS. 2A and 2B show perspective bottom views of the lower portion 16 of the capsule 12 of the sensor module 10 with two different configurations of the fastening member 18. In FIG. 2A the fastening member 18 is closed and in FIG. 2B the fastening member 18 is open. In the exemplary embodiment shown in FIGS. 2A and 2B, the fastening member 18 comprises a bar 20 having a notch 22 and a bore 24. In its closed state shown in FIG. 2A, the bar 20 is attached to the lower portion 16 of the capsule 12 via two fastening screws 26a, 26b inserted through the notch 22 and the bore 24, respectively. As can be seen from FIG. 2B, the bar 20 is attached to the lower portion 16 of the sensor module 10 in such a way that the bar 20 can be rotated around a longitudinal axis of the fastening screw 26b. Therefore, the notch 22 can engage and disengage the fastening screw 26a depending on its rotational position.

The fastening member 18 provides for a quick and uncomplicated attachment and detachment of the sensor module 10, obviating the need of additional tools. Thanks to this simple attachment mechanism, the sensor module 10 can flexibly be used with a variety of different dispensers and/or holders. It is to be understood that the present invention is not limited to a fastening member as explained above. The fastening member 18 can, for example, alternatively comprise a spring-loaded element, a snap-lock connection, a clip connection, or a combination thereof.

As can be seen from FIGS. 2A and 2B, the fastening member 18 protrudes from the bottom surface 17 of the lower portion 16. For some configurations of dispensers and/or holders, it may not be possible to fasten the sensor module 10 to the respective dispenser and/or holder. The bottom surface 17 of the sensor module 10 may thus be a planar surface configured to be placed on a planar surface of the dispenser and/or holder. In such a case, it is beneficial that the fastening member 18 can be completely detached from the sensor module 10. According to the embodiment shown in FIGS. 2A and 2B, the detachment of the fastening member 18 can be performed by detaching fastening screws 26a, 26b from the bottom surface 17. A detachable fastening member 18 as presented herein extends the variety of application scenarios of the sensor module 18. For example, the planar bottom surface 17 of the sensor module 10 may be placed on an even surface (e.g. within a holder for a container) and a container containing hygienic gloves may be placed on the top surface 14 of the capsule 12 of the sensor module 10. Alternatively or additionally, the sensor module 10 with detached fastening member 18 may be placed in a holder next to a patient's bed and a container containing a disinfectant fluid may be placed in the holder on the top portion 14 of the capsule 12.

Figure 3B:
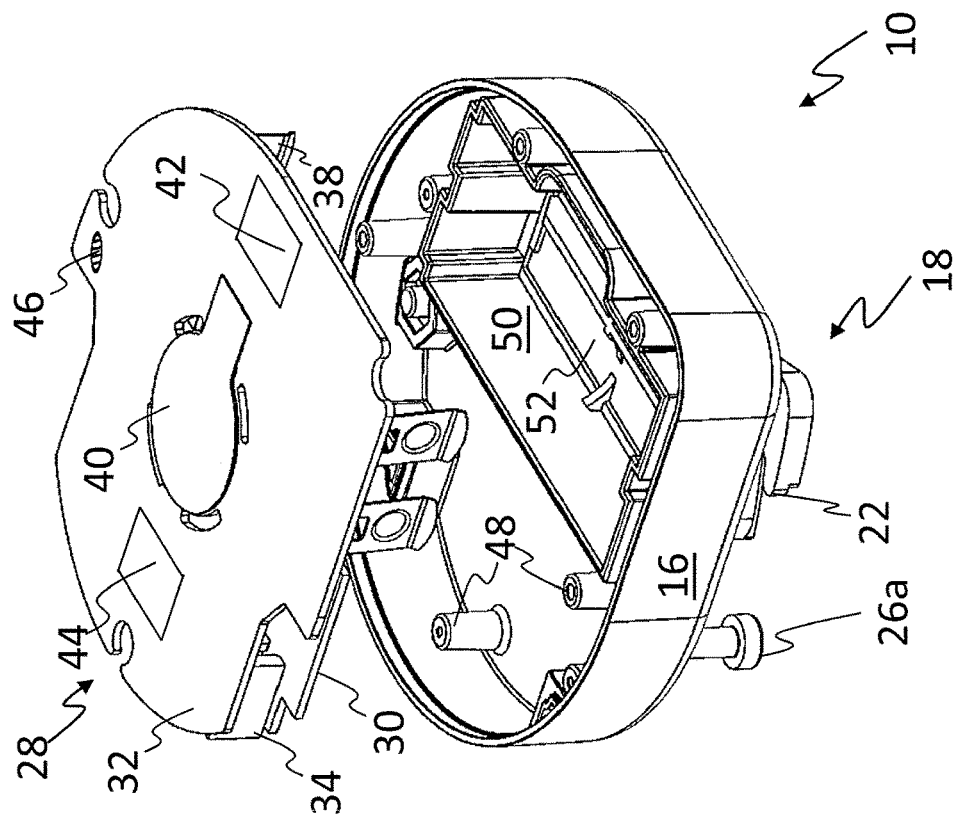
FIG. 3B shows a top view of the manufacturing step of mounting the circuitry assembly to the lower portion of the sensor module of FIG. 1.
Figure 3A:
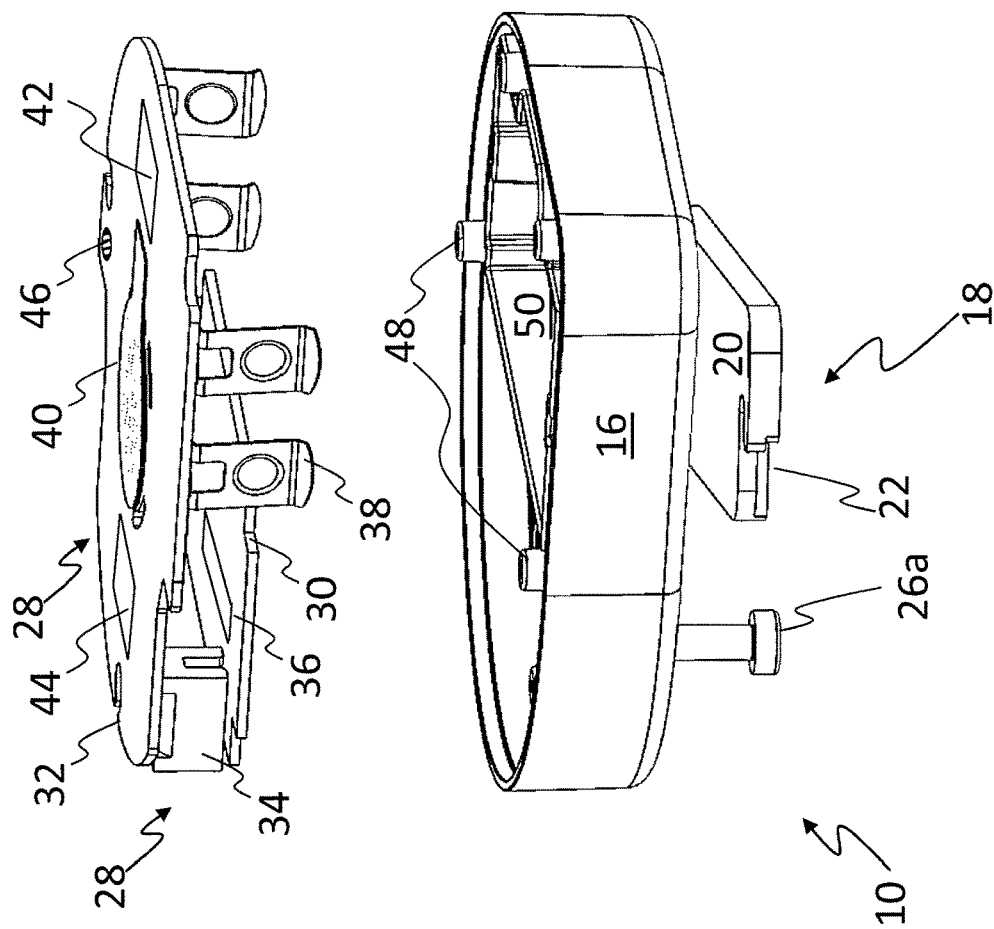
FIG. 3A shows a side view of a manufacturing step of mounting a circuitry assembly to the lower portion of the sensor module of FIG. 1.

FIGS. 3A and 3B show perspective views of an exemplary embodiment of the lower portion 16 of the capsule 12, wherein a circuitry assembly 28 is to be mounted therein. FIG. 3A shows a perspective side view and FIG. 3B shows a perspective top view of the lower portion 16 of, the capsule 12.

The circuitry assembly 28 comprises a base printed circuit board (PCB) 30, an add-on PCB 32 and a connector 34. The base PCB 30 comprises a processor 36 with an associated memory (not shown).

The add-on PCB 32 comprises battery clips 38, a first sensor 40, an optional second sensor 42 and an optional third sensor 44. The first sensor 40, the second sensor 42 and the third sensor 44 are electrically coupled to the processor 36. The connector 34 is configured to electrically and mechanically connect the base PCB 30 and the add-on PCB 32. In another embodiment, the two PCBs 30, 32 may be connected via individual wirings, and in still another embodiment, there may only be provided one PCB 30, 32 comprising the first sensor 40, the second sensor 42, the third sensor 44 and the processor 36. The battery clips 38 are configured to receive batteries (not shown) for providing power to the circuitry assembly 28.

The first sensor 40 may be one of a force sensor, a pressure sensor and a mechanical switch. In the present embodiment, the first sensor 40 is a force sensor and configured to measure a parameter (i.e., the force) associated with an elastic deformation of the capsule 12.

The second sensor 42 is one of an acceleration sensor, a compass, a gyroscope and a sensor of a satellite-based positioning device (e.g., a GPS sensor). In the present embodiment, the second sensor 42 is an acceleration sensor and configured to detect at least one of a movement and a position change of the sensor module 10.

The third sensor 44 is an optical sensor (e.g., sensitive to IR or visible light). In the present embodiment, the third sensor 44 is an IR sensor and configured to detect at least one of a current filling level of a dispenser for a hand hygiene product and an exchange of the dispenser.

The second sensor 42 and the third sensor 44 may further improve the accuracy of the measurement of a parameter associated with an elastic deformation of the capsule 12 as taken by the first sensor 40. Alternatively or additionally, the second sensor 42 and the third sensor 44 may be configured to measure additional parameters.

The operation of the first sensor 40, the second sensor 42 and the third sensor 44 will be explained in detail in conjunction with FIGS. 5A to 5D and 6A to 6C below. It is to be understood that the sensor module 10 may also comprise more or less than three sensors.

The circuitry assembly 28 illustrated in FIGS. 3A and 3B further comprises a radio transceiver 46 with receiving and transmitting functions. The radio transceiver 46 is configured to identify a nearby radio transmitter or radio tag (e.g., an RFID tag, not shown) with a personalized and/or person group identifier. This identification may be made in the context of the measurement of an elastic deformation of the capsule 12 of the sensor module 10. The processor 36 is thus configured to assign data related to a deformation detected by the first sensor 40 to a specific person and/or a specific person group. The processor 36 is further configured to save this information (e.g., in a data set as shown in FIG. 12) and transmit it, either immediately or after a given time period, to a base station (not shown) via the radio transceiver 46. Alternatively, the saved information is transmitted from the processor 36 to the base station via an additional radio transceiver (not shown), e.g., a transponder attached to a user's clothes. In still another embodiment, the saved information may be transmitted from one sensor module to another and finally to the base station according to a bridging architecture. This enables the monitoring of the specific usage of dispensers by different persons and/or groups of persons.

As can be seen in FIG. 3B, the lower portion 16 of the capsule 12 comprises a plurality of mounting elements 48 for mounting the top portion 14 to the lower portion 16 of the capsule 12, such that the circuitry assembly 28 is sandwiched between the top portion 14 and the lower portion 16 of the capsule 12. The lower portion 16 comprises a casing 50 for accommodating the battery clips 38 and the batteries electrically coupled thereto. A bottom section 52 of the casing 50 can be opened in order to replace empty batteries (see FIGS. 2A and 2B).

Figure 4:
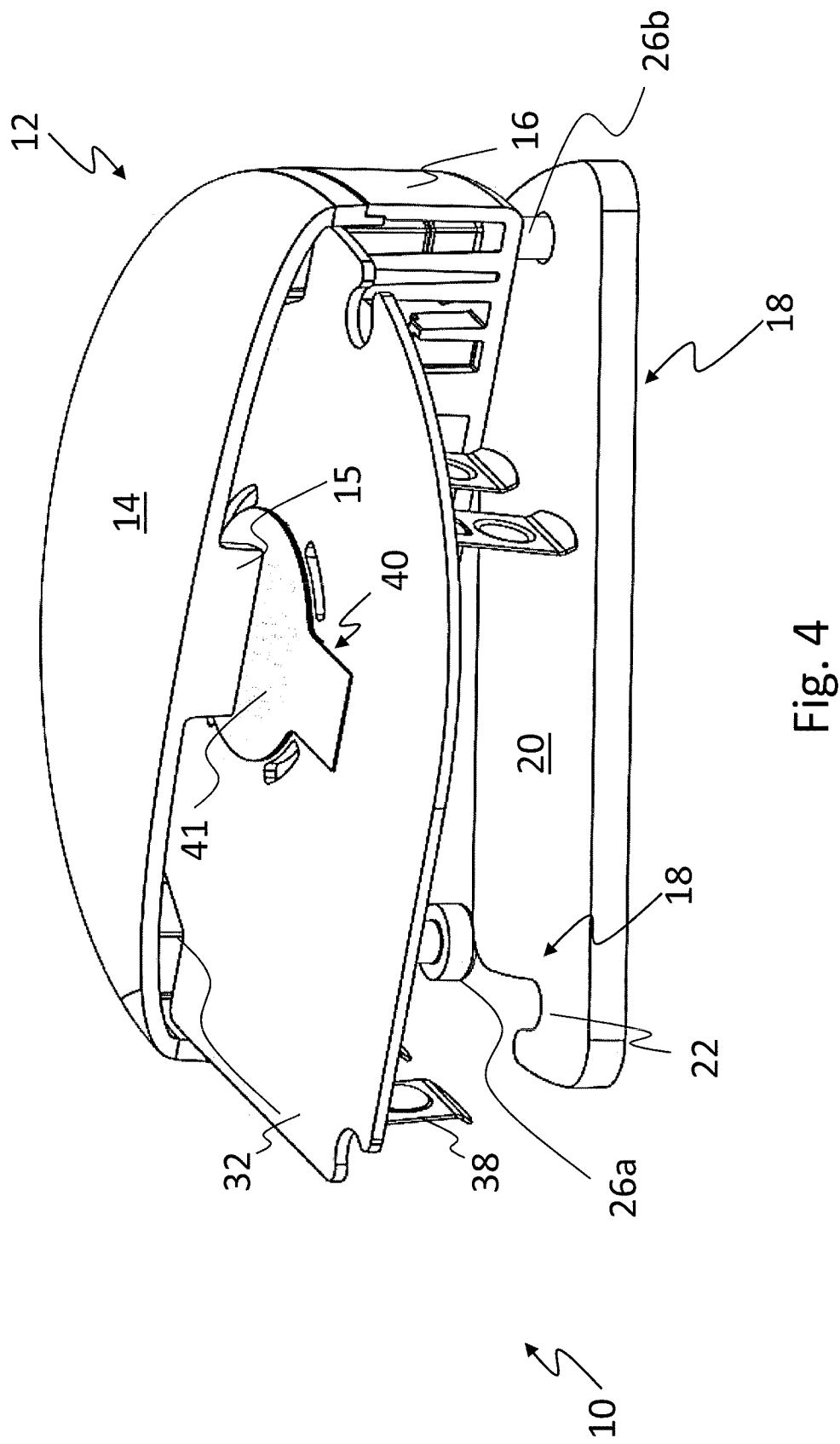
FIG. 4 shows a perspective cross-sectional view of the sensor module along the line A-A in FIG. 1.

FIG. 4 shows a perspective internal view of the capsule 12 along the line A-A depicted in FIG. 1. The top portion 14 of the capsule 12 can be brought or is in contact with the first sensor 40 via a mechanic link 15 in the form of a protrusion extending from an inner surface of the top portion 14 of the capsule 12 towards the first sensor 40. If the top portion 14 is elastically deformed, the link 15 moves downward in the direction towards the first sensor 40. When the link 15 touches the first sensor 40, the first sensor 40 measures the degree of deformation of the top portion 14. The degree of deformation of the top portion 14 is detected by the first sensor 40 by measuring a force acting upon a measurement surface 41 of the first sensor 40. Alternatively or additionally, the first sensor 40 may detect the degree of deformation of the top portion 14 by measuring the displacement of the measurement surface 41 from an initial position. Alternatively or additionally, the first sensor 40 may measure a restoring force resulting from a return of the top portion 14 to its initial undeformed state, thereby releasing the link 15 from the contact with the first sensor 40. Thus, the degree of deformation of the top portion 14 and a parameter associated therewith (such as a maximum force or a duration of force application or of a force increase) may precisely be measured by the first sensor 40.

The embodiment of FIG. 4 shows a single first sensor 40 and a single link 15 located in the center of add-on PCB 32. It is to be understood that the present disclosure is not limited thereto. Alternatively, the first sensor 40 could for example cover the whole surface of the add-on PCB 32 and the link 15 may extend along the whole inner surface of top portion 14. In another embodiment, a plurality of first sensors 40 may be arranged next to each other on the add-on PCB 32, wherein a plurality of links 15 may be arranged next to each other on the inner surface of the top portion 14.

The embodiment shown in FIG. 4 enables a direct and lossless transfer of the elastic deformation of the top portion 14 of the capsule 12 to the first sensor 40. The processor 36 is configured to at least temporarily record the measured parameter and an event associated therewith.

The parameter associated with the degree of deformation of the top portion 14 may for example be representative of a weight of a container containing a hand hygiene product. Thus, the force acting on the top surface 14 of the capsule 12 may be the gravitational force of the container. A restoring force resulting from a return of the top portion 14 to its initial undeformed state may thus be a force acting against the gravitational force of the container, especially upon removal of the container.

The event associated with the measured parameter may be the actuation of the dispenser for a hand hygiene product. The actuation of the dispenser may produce an additional force acting on the top surface 14 of the capsule 12 besides the already acting gravitational force of the container. This additional force may thus cause a change in the measured weight of the container. This change (e.g., the change in the measured force or the duration of the change) may be indicative of the amount of a hand hygiene product, for example the amount of liquid disinfectant dispensed from the container. Thus, a change in the filling level of the container can be tracked.

Figure 5B:
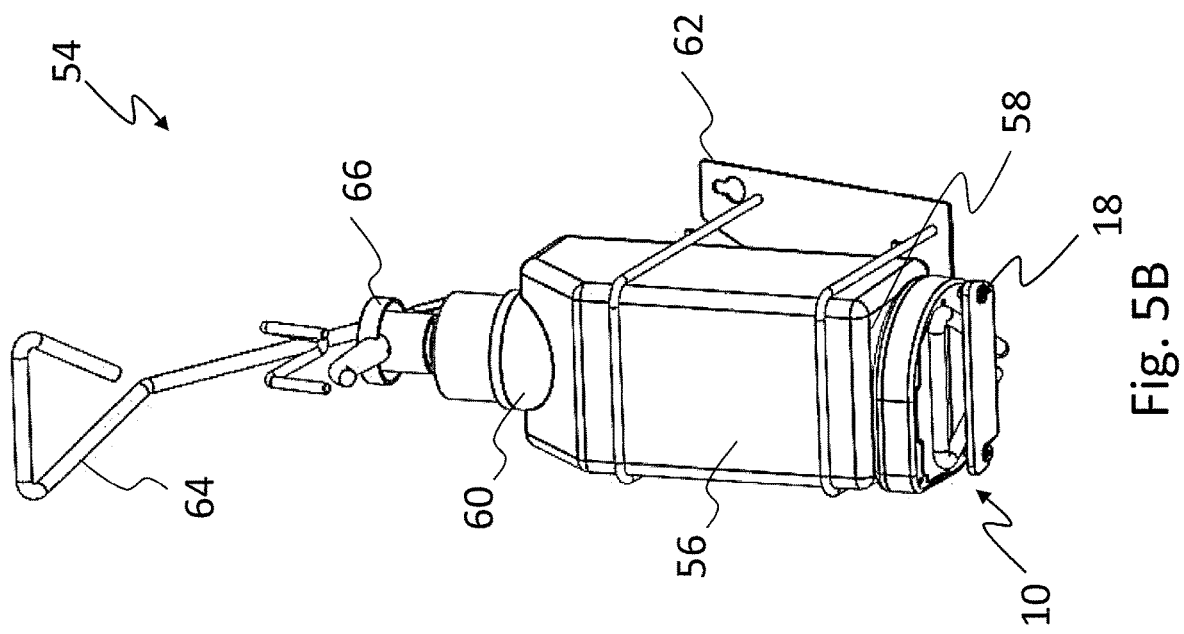
FIG. 5B shows the first embodiment of the dispensing system with a closed fastening member.
Figure 5A:
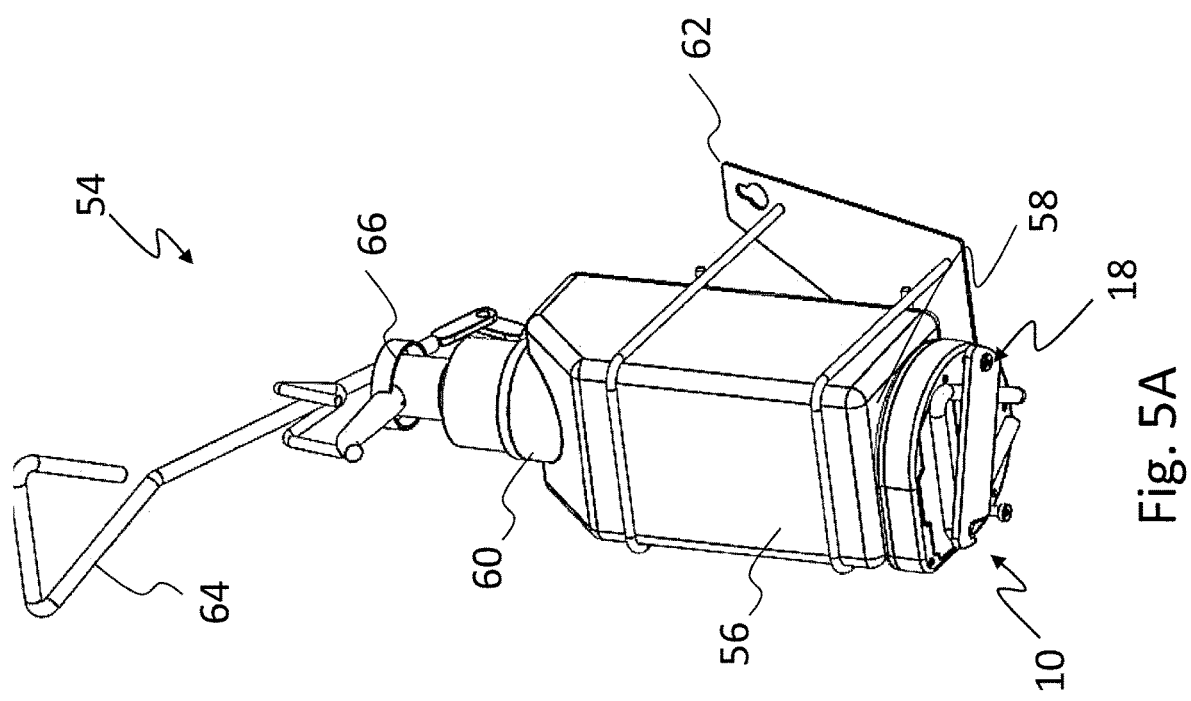
FIG. 5A shows a first embodiment of the dispensing system with an open fastening member.
Figure 5D:
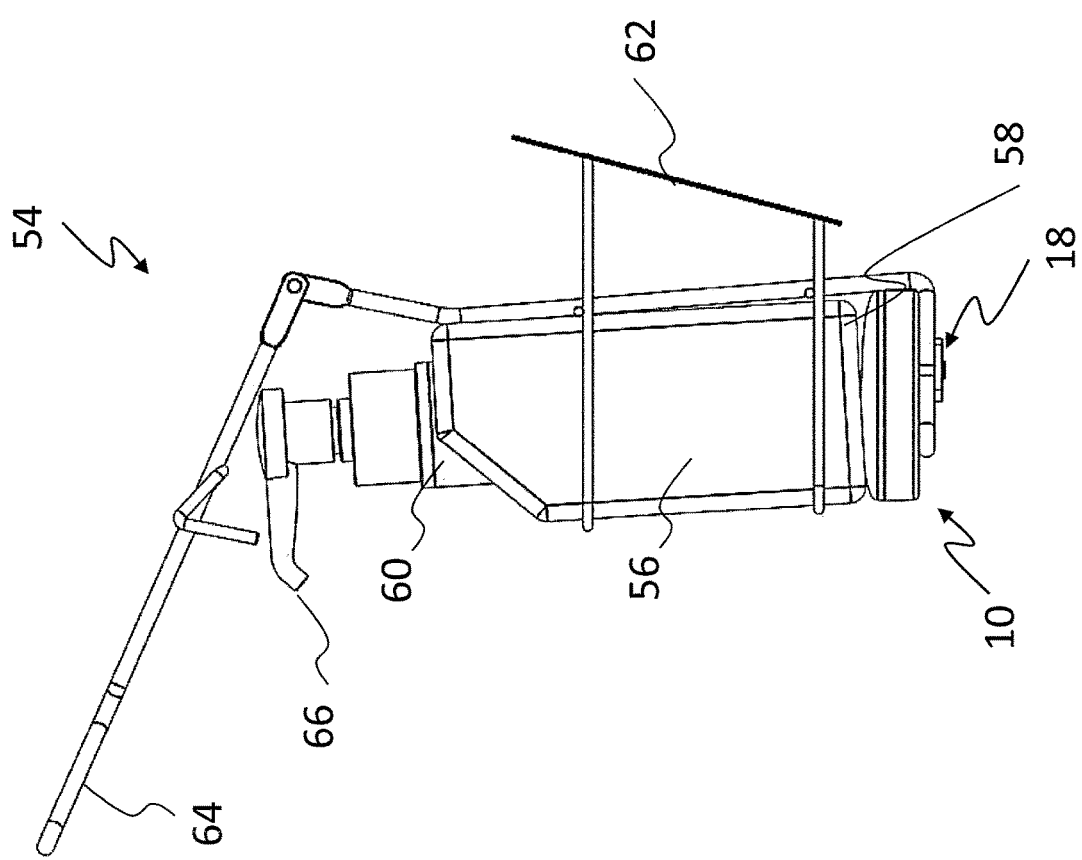
FIG. 5D shows a side view of the first embodiment of the dispensing system.
Figure 5C:
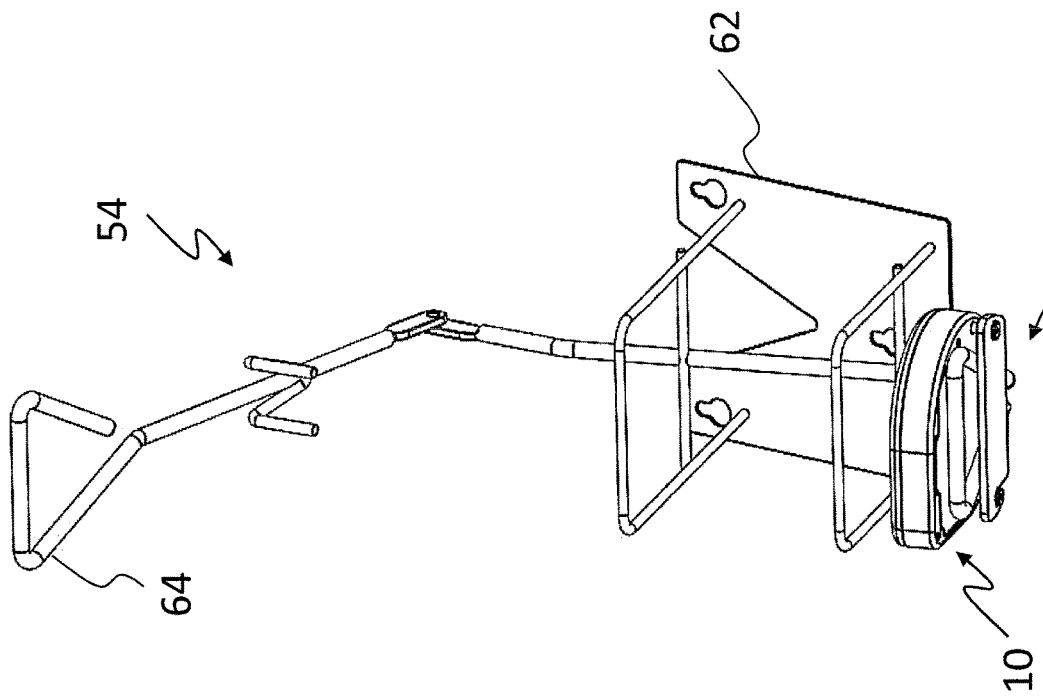
FIG. 5C shows the first embodiment of the dispensing system without a container of the dispenser.

FIGS. 5A to 5D show a first embodiment of a dispensing system 54 for a hand hygiene product according to the present disclosure. The system 54 comprises a container 56, the sensor module 10 and a holder 62. FIG. 5A shows the fastening member 18 of the sensor module 10 in an open state, FIG. 5B shows the fastening member 18 of the sensor module 10 in a closed state, FIG. 5C shows the system 54 without the container 56, and FIG. 5D shows a side view of the system 54.

As shown in FIG. 5A, the sensor module 10 is attached to the holder 62 via the fastening member 18. The container 56 is mounted to the holder 62 such that the bottom 58 of the container 56 rests on the top surface 14 of the capsule 12 of the sensor module 10. The container 56 contains a fluid, such as a disinfectant. The holder 62 also comprises a lever configured as a pumping arm 64 to activate a pumping mechanism 66 mounted to a dispensing opening 60 of the container 56. As can be seen from FIGS. 5A, 5B and 5D, the dispensing opening 60 is located opposite to the bottom 58 of the container 56. The pumping arm 64 activates the pumping mechanism 66, resulting in a specific amount of disinfectant being dispensed through the dispensing opening 60 upon a full depression of the pumping arm 64 onto a user's palm, a tissue or a working surface placed below the pumping mechanism 66.

Placing the bottom 58 of the container 56 on the capsule 12 of the sensor module 10 produces a gravitational force acting on the top surface 14, due to the weight of the container 56. Said gravitational force leads to a continuous elastic deformation of the top surface 14. A parameter associated with said deformation is measured by the first sensor 40 in a manner as described in conjunction with FIG. 4. In the present embodiment, the parameter associated with the elastic deformation of the capsule 12 is representative of a weight of the container 56. Moreover, pressing the pumping arm 64 downwards in a direction towards the sensor module 10 produces an additional force acting onto the top surface 14, which is likewise measured as an event by the first sensor 40. Accordingly, in the embodiment shown in FIGS. 5A, 5B and 5D, the associated event is representative of an actuation of the dispensing system 54.

The weight of the container 56 can directly be related to a current filling level of the container 56. Thus, the processor 36 may be further configured to determine said current filling level. Replacing an empty or nearly empty container 56 with a refilled new container also leads to a change in the weight of the container 56. Hence, the processor 36 may additionally be configured to determine a replacement or filling of the container 56. To further improve the accuracy of the measurement and in order to prevent the use of an empty container 56, the processor 36 may be further configured to repeatedly acquire the parameter at predefined points in time. The processor 36 may also operate based on configured thresholds. Configured thresholds may be predefined weights of the container 56. For example, if the measured weight of the container 56 is below 50 g, this may indicate that no container is located inside the dispenser. On the other hand, if the weight of the container 56 is above 450 g, this may indicate that the container 56 is full (e.g., has been refilled). Alternatively or additionally, a configured threshold may be, for example, 90% of the critical load of the first sensor 40. A visual and/or acoustic warning may be output if this critical load is exceeded.

Thus, the presence and/or actuation of the container 56 on the top portion 14 of the sensor module 10 as well as the current filling level of the container 56 can directly be measured by the sensor module 10 without any additional effort on the part of a healthcare worker. The healthcare worker may thus be more motivated to use a dispensing system 54 equipped with the sensor module 10. The healthcare worker may also be more aware of the importance of a proper hand hygiene and may take care of always refilling empty containers.

As described in conjunction with FIGS. 3A and 3B, the sensor module 10 further comprises the second sensor 42. The second sensor 42 is configured to detect at least one of a movement and a position of the sensor module 10. The data detected by the second sensor 42 may be transmitted (via the transceiver 46) to a base station (not shown) in order to monitor the locations of multiple dispensing systems 54 equipped with the sensor module 10, disposed at a variety of different locations. For example, the sensor module 10 may be mounted to a patient's bed. When the bed is moved, for example from one station of a hospital to another, the sensor module 10 may still be trackable by a healthcare monitoring system based on the location information received via the base station from the second sensor 42. More precisely, a plurality of sensor modules 10 may be monitored by and connected to a base station of the healthcare monitoring system. For example, all sensor modules 10 within a department of a hospital may be connected to base station monitoring the usage of the sensor modules 10 throughout the department. If a sensor module 10 leaves the radio coverage of said base station, the usage of the respective sensor module 10 may no longer by monitored. In contrast thereto, if the position of a sensor module 10 can continuously be tracked using the second sensor 42, the sensor module 10 may automatically be registered at and monitored by the base station closest to the new location of the sensor module 10, without the need of manually updating its respective position. Depending on the current location of the sensor module 10, the healthcare monitoring system may be able to determine whether the patient's bed to which the sensor module 10 is attached to is currently occupied or is prepared for a new patient. For example, in case the sensor module 10 is detected inside a patient room or a patient treating area, this may indicate that the bed is in use. On the other hand, if the sensor module 10 is detected inside another specific location of the hospital, this may indicate that the bed is currently prepared for a new patient.

Additionally, the sensor module 10 comprises the third sensor 44, being an optical sensor. The third sensor 44 is configured to detect a current filling level or an exchange of the container 56, optionally in addition to or instead of the first sensor 40. This is realized by emitting light from a light source in the sensor module 10 towards or into the container 56. The third sensor 44 may regularly analyse the amount of light reflected back by or through the container 56 and compare the amount of back-reflected light with the amount of emitted light. Alternatively, the third sensor 44 may analyse the amount of ambient light falling from outside of the container 56 through the container 56 onto the third sensor 44. The processor 36 may regularly compare the amount of light falling onto the third sensor 44 with a preceding amount of light and/or a reference amount of light.

Figure 6C:
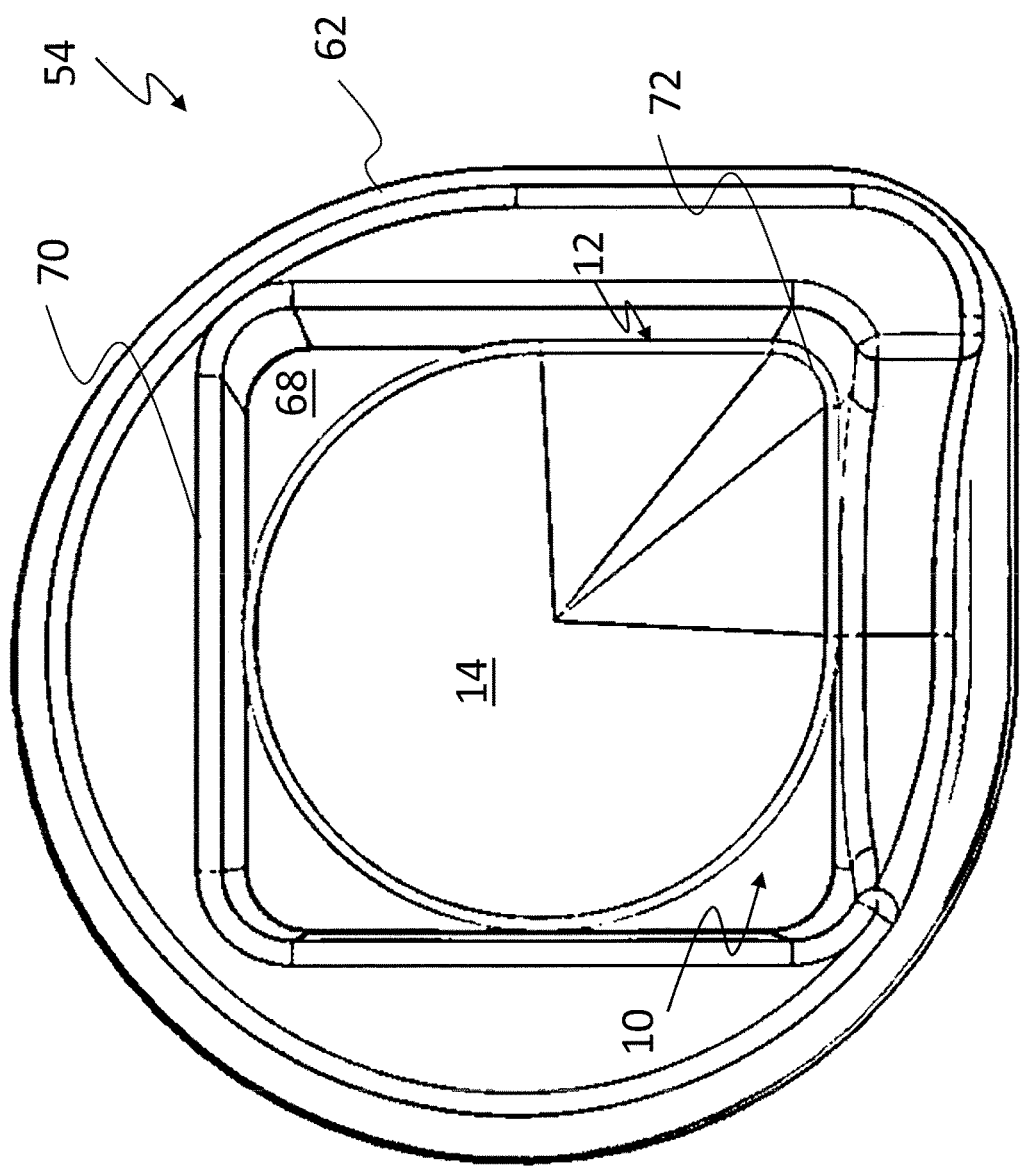
FIG. 6C shows a top view of the holder of the second embodiment of the dispensing system with a sensor module received therein.

FIGS. 6A to 6C show a second embodiment of a dispensing system 54 according to the present disclosure. FIG. 6A shows a front view and FIG. 6B shows a bottom view of the sensor module 10, a container 56 and a holder 62. FIG. 6C shows a top view of the holder 62 and the sensor module 10 attached thereto. The container 56 contains fluid, such as a disinfectant. In the embodiment shown in FIGS. 6A to 6C, the fastening member 18 is detached from the sensor module 10. As can be seen in FIG. 6C, this detachment ensures that the bottom surface 17 of the sensor module 10 can be aligned in direct contact with an inner surface 68 of an opening or recess 70 in the holder 62.

In this embodiment, the pumping mechanism 66 is directly activated by the user without the additional movement of a lever such as the pumping arm 64. In the same manner as described in conjunction with FIGS. 5A to 5D, a current filling level and/or an exchange of the container 56 may be detected by sensor module 10.

The recess 70 is configured to receive the sensor module 10 in a form-fitting manner. To this end, the capsule 12 has the form of a circular drop with a protruding nose 72. The recess 70 has a quadratic form with a diameter slightly larger than the diameter of the capsule 12, wherein the nose 72 prevents rotation of the sensor module 10 in the recess 70. The container 56 is placed inside the recess 70, such that the bottom 58 of the container 56 rests on the top surface 14 of the capsule 12. Hence, a current filling level and an exchange of the container 56 can be measured.

Further embodiments of the sensor module 10 will be described below in conjunction with FIGS. 7 to 11.

Figure 7:
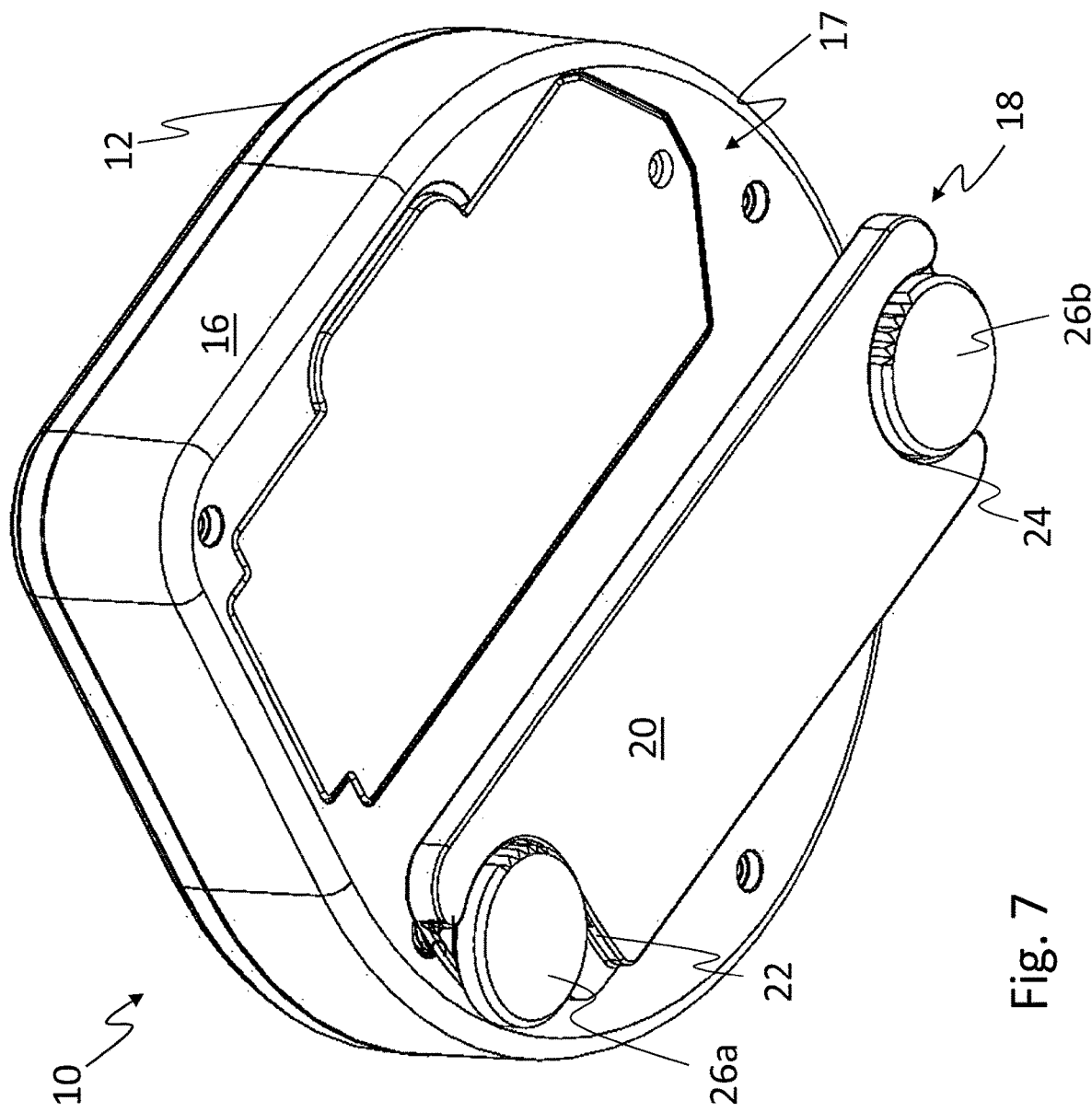
FIG. 7 shows an alternative realization of the fastening member.

FIG. 7 shows an alternative embodiment of the fastening member 18. Herein, the fastening screws 26a, 26b comprise a rim instead of a screw-driver recess as depicted in FIGS. 2A and 2B. The rim is formed such that it can be gripped by a user's finger. Thus, the fastening screws 26a, 26b can be turned (and removed or attached) without any additional tool.

Figure 8:
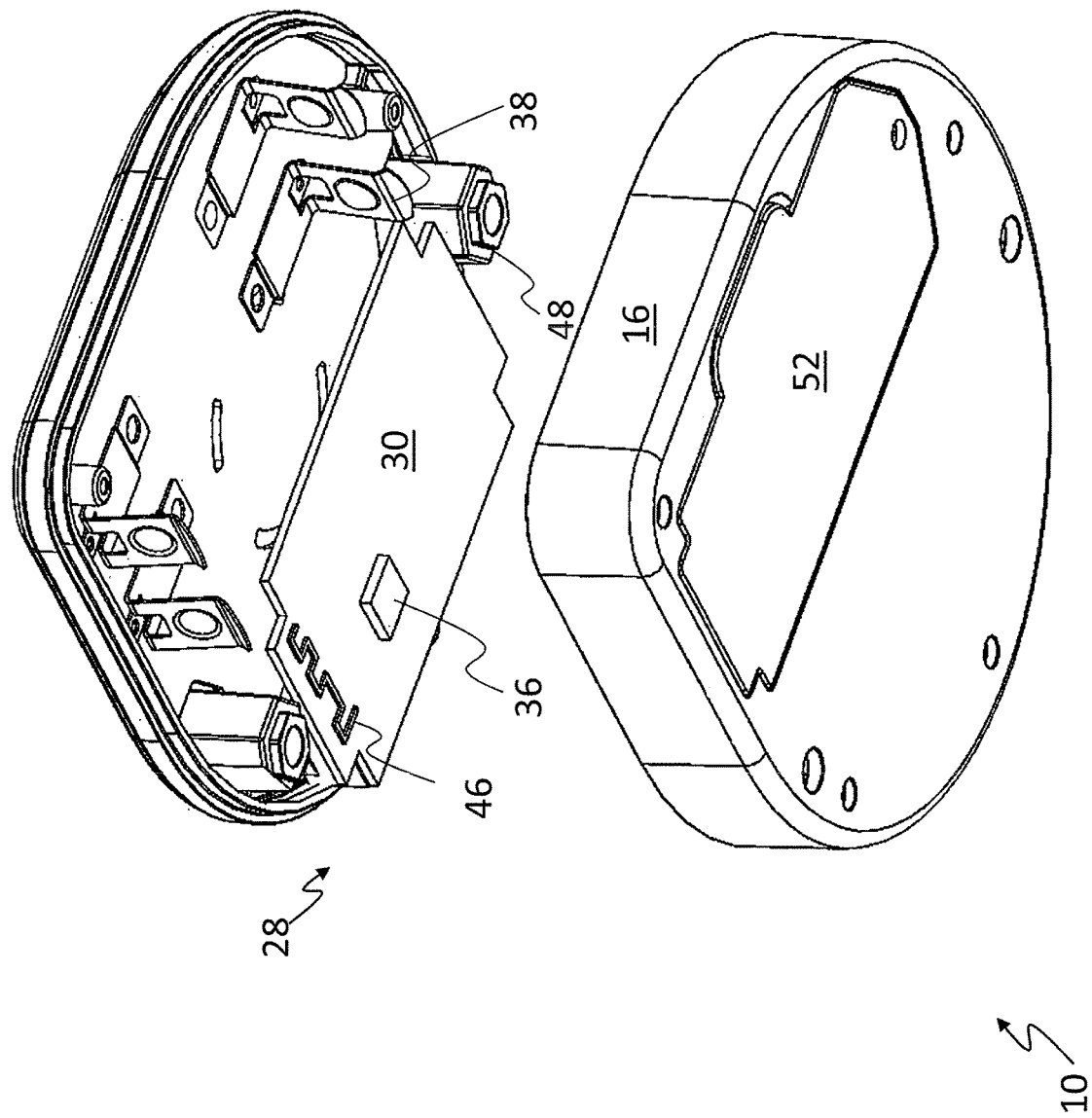
FIG. 8 shows an realization embodiment of the circuitry assembly.

FIG. 8 shows an alternative embodiment of the circuitry assembly 28 unmounted from the lower portion 16 of the capsule 12. Herein, the radio transmitter 46 and the processor 36 are mounted to the lower surface of the base PCB 30. As the radio transmitter 46 and the processor 36 are electrical components very sensitive to, for example, fluids, mounting them to the lower surface of the base PCB 30 better prevents these components from being damaged.

Figure 9:
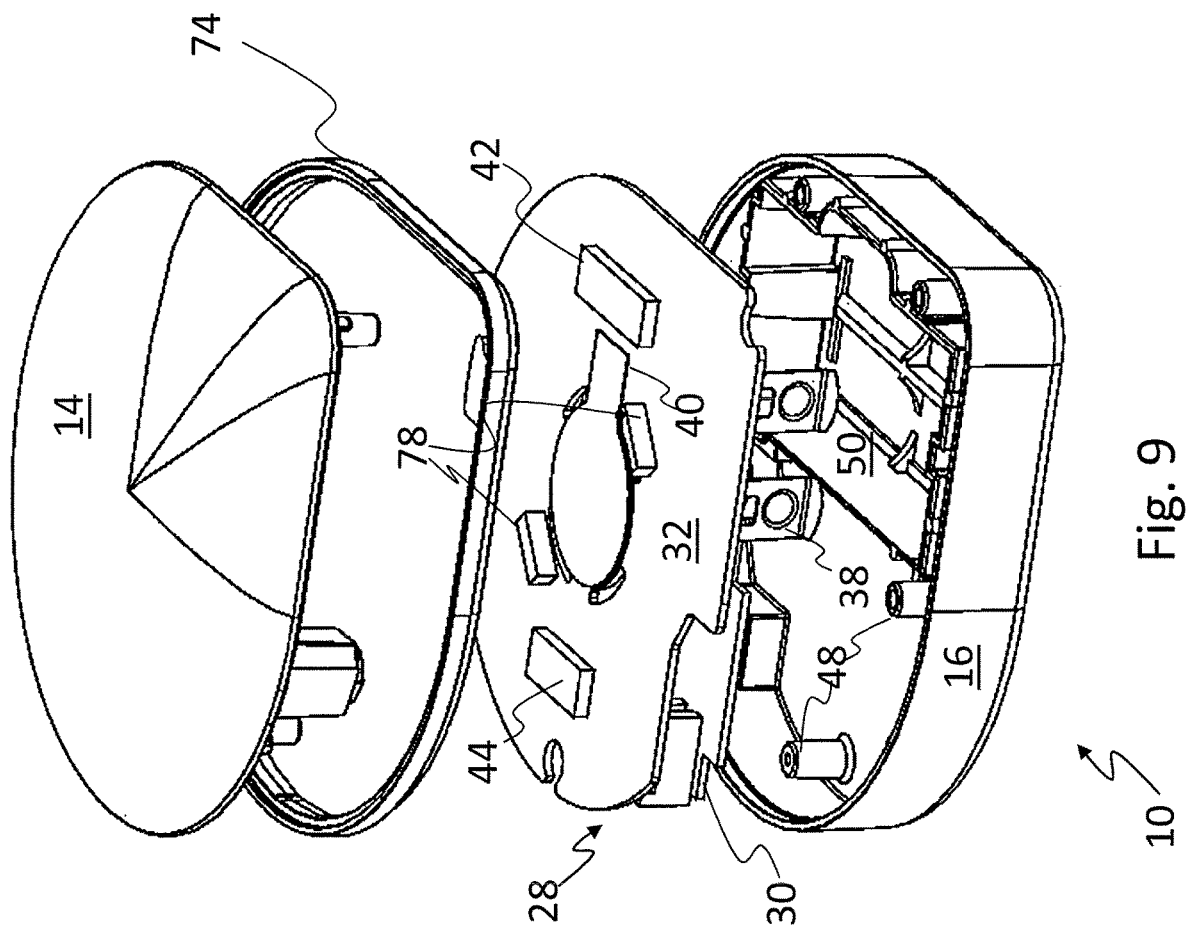
FIG. 9 shows an embodiment of the sensor module comprising a sealing element.

FIG. 9 is an embodiment, wherein the sensor module 10 further comprises a ring-shaped sealing member 74 configured to seal the seal the capsule 12. This sealing prevents liquids, such as a liquid disinfectant, from entering the inside of the capsule 12. Hence, electric components arranged inside the capsule 12 will be protected. The sealing will not influence the elastic deformability of the capsule 12. Specifically, the sealing element 74 can be made of an elastically deformable material that permits an elastic deformation of the capsule 12 to be measured by the first sensor 40. The sealing element 74 may be transparent for the reasons now discussed in more detail.

Figure 10:
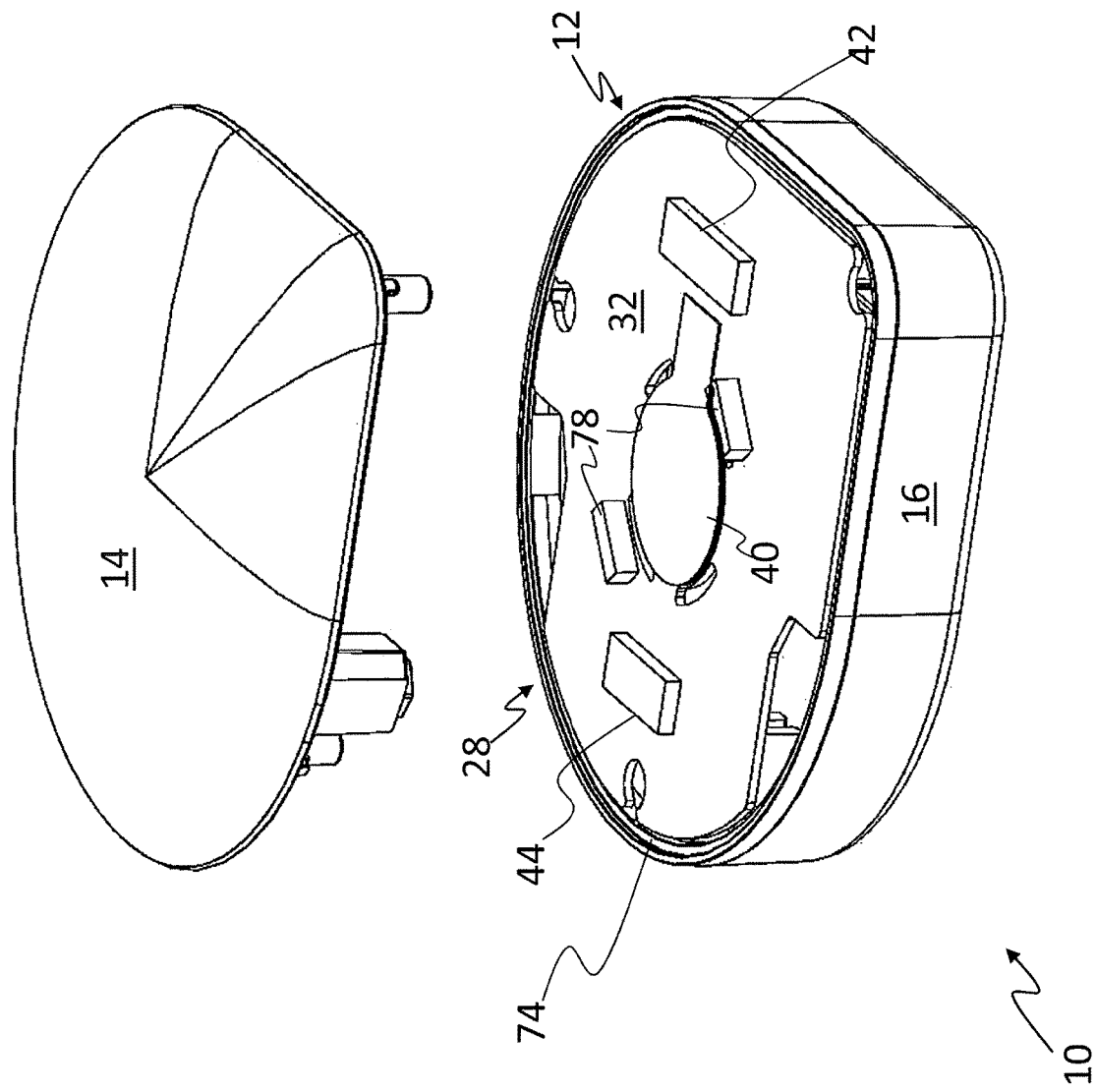
FIG. 10 shows a further view of the embodiment of FIG. 9 at a later manufacturing step.

FIG. 10 shows an embodiment, wherein the sealing member 74 is placed on the lower portion 16 of the sensor module 10 of FIG. 9. Two light-emitting elements 78 (e.g., a red and a green LED) are coupled to the processor 36 and configured to provide feedback to a user regarding the measurement of an elastic deformation of the capsule 12 and/or an associated event. For example, if a measured parameter relating, for example, to a dispensing action is above a predefined threshold, one of the light-emitting elements 78 may emit green light. Further, if the measured parameter is below the threshold, one of the light-emitting elements 78 may emit a red light. The measured parameter may be a force value, a maximum force value, and a duration in which a force or a change of a force can be measured. Additionally or alternatively, one or both of the light-emitting elements 78 may change the color of the emitted light with respect to actuation of the pumping mechanism 66. For example, the light-emitting elements 78 may emit green light when the pumping mechanism 66 is fully released and may emit red light when the pumping mechanism 66 is fully depressed.

Figure 11:
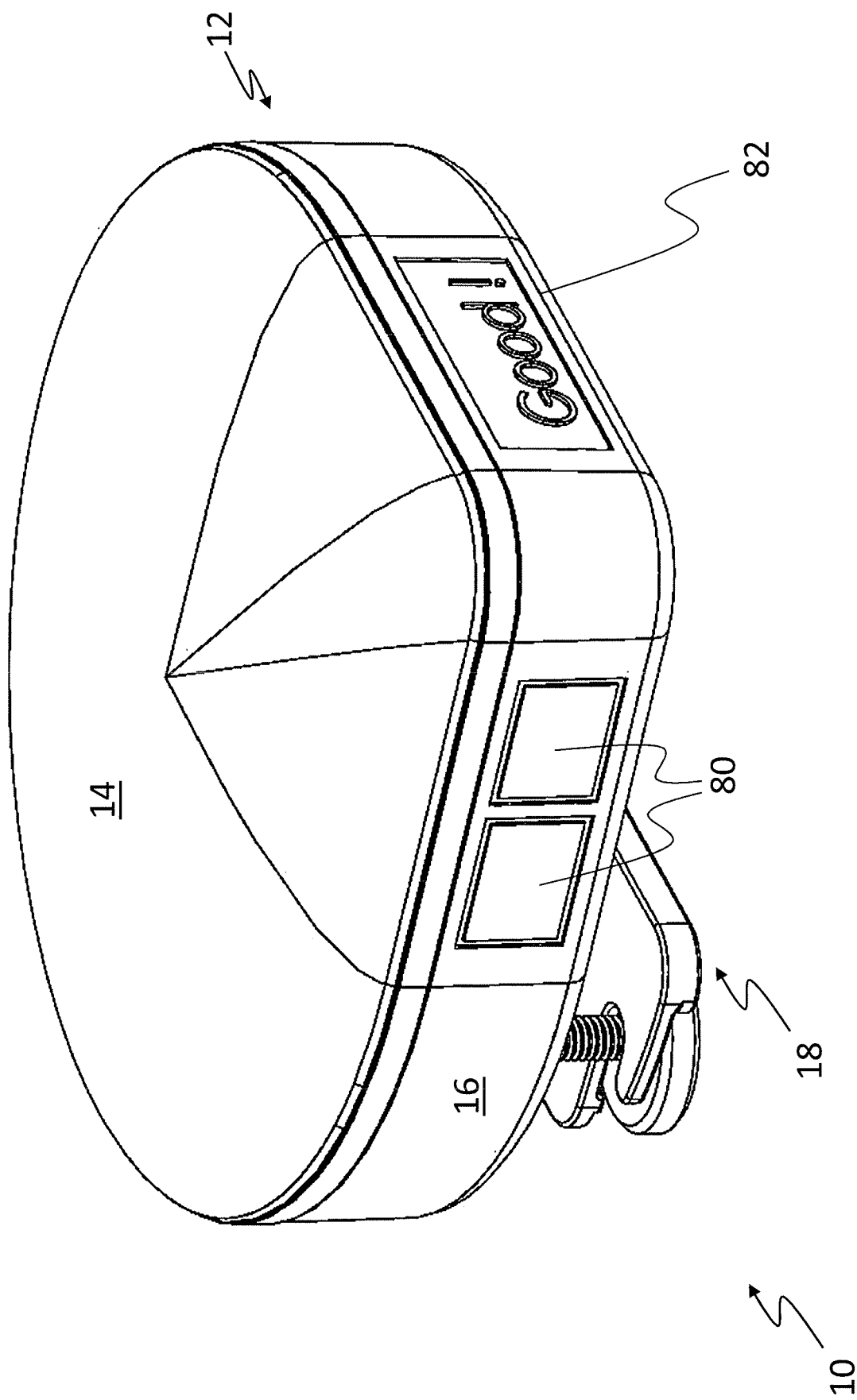
FIG. 11 shows an embodiment of the sensor module comprising buttons and a display device.

FIG. 11 show an embodiment, wherein the capsule 12 comprises buttons 80 and/or a display device 82. The buttons 80 and/or the display device 82 may enable a user to receive information regarding the current state of the sensor module 10 and/or to adjust settings of the senor module 10. The buttons 80 and the display device 82 are combined into a touch-sensitive panel.

FIG. 12 shows a table 84 comprising five datasets 84A to 84E created by the processor 36 and being indicative of operation event types of the dispenser. These event types may in particular relate to actuation events resulting from actuation of the pumping mechanism so as to dispense fluid. These datasets 84A to 84E may at least temporarily be recorded by the processor 36, in particular in a memory located within the capsule 12 and electrically connected to the processor 36.

As can be seen from FIG. 12, the table 84 indicates for each dataset 84A to 84E (i.e., for each detected operation event type of the dispenser) a consecutively assigned operation event type number, a time stamp, a category of the operation event type, an initial voltage measured by the first sensor 40, a peak voltage of an operation-induced voltage change measured by the first sensor 40, a duration of the operation event type, a spatial movement of the sensor module 10 detected by the second sensor 42, an orientation of the sensor module 10 detected by the second sensor 42, a closest frame of reference (i.e., identifier) of a nearby base station, a voltage value of the third sensor 44 and a battery level of the sensor module 10.

The voltage of the first sensor 40 is indicative of a degree of deformation of the top portion 14 of the capsule 12 measured by the first sensor 40 as described above. Said degree of deformation is transformed into an electrical voltage according to techniques known in the art. Herein, an initial voltage is representative of a static deformation of the top portion 14 of the capsule 12 in which the container 56 rests with its bottom 58 on the top portion 14 of the capsule 12. Thus, the force acting upon the top portion 14 of the capsule 12 in the initial measurement state is the gravitational force of the container 56 (and, thus, is indicative of a weight of the empty container 56 plus the fluid contained therein, etc.).

Moreover, a voltage change resulting, for example, from an actuation of the pumping mechanism will lead to a voltage change peak voltage being measured by the first sensor 40. The peak voltage is indicative of a maximum force applied to the top portion 14 of the capsule 12, i.e., the maximum degree of deformation measured by the first sensor 40 during the event duration (e.g., due to a non-static deformation resulting from actuation of the pumping mechanism). The voltage change must exceed a threshold relative to the initial voltage in order to start both detection of a voltage change and an associated timer. If the voltage change falls below said threshold (or different threshold), the force change detection and the timer are stopped and the measured parameters (in particular the peak voltage and the event duration as measured by the timer) are recorded as parameters in a memory of the sensor module 10.

A force applied to the top portion 14 of the capsule 12 must exceed a minimum time duration threshold in order for the sensor module 10 to start a force detection measurement. For example, if the peak voltage exceeds 3000 mV over a time duration of 20 ms, no force detection measurement will be performed by the sensor module 10. If the minimum peak voltage threshold as well as the minimum time duration threshold are exceeded, the sensor module 10 will start detecting a force applied to the top portion 14 of the sensor module 12, i.e., an operation event type of the dispenser and categorize the detected operation event types. An operation event type falls in the category "Actuation" if the detected event duration exceeds a second time duration threshold. In other words, an operation event type must be long enough to qualify as an actuation event of the dispenser and, additionally, lie above a voltage threshold.

As explained above, the second sensor 42 is configured to detect at least one of a movement and a position of the sensor module 10. The movement of the sensor module 10 is detected in three or more axes by the second sensor 42 by way of acceleration data and an average acceleration of the sensor module 10 during the event duration and a short time period before the event duration is determined by the processor 36. The average acceleration is stored in units of the earth's acceleration (G). Furthermore, the orientation (either up or down) of the sensor module is detected (e.g., by a gyroscope) and also stored in the datasets 84A to 84E.

For determining the approximate position of the sensor module 10 during a force detection measurement, the sensor module 10 receives signals form the closest base station (of, e.g., a hand hygiene monitoring system) and stores the address or any other identifier of this base station in the created dataset. Therefore, movement of the sensor module 10 inside a hospital for example can be tracked.

The current filling level of the container 56 and/or an exchange of the container 56 may also be detected by third sensor 44 being an optical sensor. To do so, the third sensor 44 detects an intensity of the light falling on the top portion 14 of the capsule 12 (e.g., in the region of the dome-shaped region of the top portion 14). When placing for example the container 56 on the top portion 12, the light intensity and thus the sensor signal of the third sensor 44 decreases. Likewise, when the amount of fluid contained in the container 56 decreases, the light intensity measured by the third sensor 44 increases. The light intensity measured by the third sensor 44 is transformed into a voltage value and stored in the datasets 84A to 84E for evaluation of the filling level by the base station.

With the values stored in the datasets 84A to 84E, a variety of operation event types of the dispenser can be defined. For example, the actuation events of the dispenser stored in the datasets 84A and 84B are defined based on the peak voltage change and the event duration as described above. As a further example, the operation event type of removing a bottle stored in dataset 84C is defined by an initial voltage of 0 and a high voltage measured by the optical sensor. Likewise, the event of inserting a new bottle stored in dataset 84E is defined by a previous remove bottle event and a high movement value in the DOWN direction. As a still further example, the event of dropping the sensor module 10 stored in dataset 84D is defined by a movement value of 0 G and a high change in the peak voltage. Finally, the fluid level of the container 56 is determined based on the initial voltage and the voltage value of the optical sensor 44.

The thresholds and defined events described above are predetermined and can be updated by the processor 36 when signalling with a base station.

The dispensing systems 54 described above have a plurality of application areas, such as wall-mounted, mounted to a patient's bed or attached to a working surface such as a table. As the sensor module 10 is re-usable, there is no need of equipping all dispensing systems 54 with sensor modules 10 of different types, which may only fit to one specific kind of dispensing system 54. Instead, the sensor module 10 can be re-used with different kinds of dispensers for hand hygiene products.

The measured parameter associated with an elastic deformation of the capsule 12 resulting from actuation or presence of a container 56 may be evaluated by the processor 36 in several ways, alternatively or additionally to the ways described in conjunction with FIG. 12.

For example, an exchange of the container 56 may be detected. If the elastically deformable capsule 12 (substantially) has returned to its initial undeformed state and, afterwards, the degree of deformation of the top portion 14 measured by the first sensor 40 is higher than the degree of deformation of the top portion 14 measured by the first sensor 40 before the capsule 12 returned to its initial undeformed state, this indicates that the container 56 has been exchanged or refilled (and this may be signaled to a base station).

The detection of the current filling level of the container 56 may be based on the higher degree of deformation of the top portion 14 due to the presence of a new or refilled container 56. Additionally, a counter counting an event representative of an actuation of the dispensing system 54 may be implemented by the processor 36. Moreover, a timer (implemented by the processor 36) may measure an expiry date of the content of the container 56, for example the expiry date of a disinfectant contained in the container 56. The timer may be started once a new or re-filled container is detected. If the timer reaches a predefined expiry date (e.g., after the same container 56 has been used for 6 months without having be refilled or replaced), a data set comprising data representative of a usage of the dispensing system 54 comprising the expired container 56 may be created and stored. Additionally, or alternatively, healthcare personnel may be informed about the expiry of the content of the container 56 (e.g., with specification of one or more of an identifier, the location and the initial filling level of the container 56). The healthcare personnel may then exchange the container 56. This approach provides for a reliable and fast exchange of empty containers 56, ensuring that all users are always provided with filled containers 56. Therefore, the amount of used hand hygiene products will increase.

Additionally, specific behavioural patterns in the usage of the dispensing system 54 for hand hygiene products may be analysed by the processor 36 or its base station. As explained in conjunction with FIGS. 3A and 3B, the radio transceiver 46 may be configured to identify a nearby radio tag with a personalized ID and/or an ID of a group of persons upon measurement of an elastic deformation of the capsule 12 of the sensor module 10. The processor 36 may thus be configured to assign data related to the detected deformation to a specific person and/or a specific professional group and store this information in a single data set and transfer the data to a radio tag.

The processor 36 may be further configured to determine whether a predefined minimum threshold of a hand hygiene product has been dispensed from the dispensing system 54, for example based on a change in the filling level of the container 56 for an individual actuation. For example, a minimum amount of disinfectant may be an amount that (under consideration of proper use) ensures that at least 99% of the bacteria on a user's palm or a working surface are removed. If the dispensed amount (as derived from an actuation force or a duration of the actuation force has been measured) is below a predefined minimum threshold, the user may be informed about the insufficient use of the hand hygiene product. For example, a light-emitting element of the sensor module 10 may emit a blinking red light. Alternatively or additionally, an optional display device may show a message reminding the user to use at least the minimum amount of hand hygiene products. As a still further alternative, or in addition, an audible warning may be generated by the sensor module 10 in such a case.

Moreover, the usage of multiple dispensing systems for hand hygiene products 54 may be compared between different departments of a hospital, between different professional groups and/or between different points in time. All employees of the hospital may be informed about the results of the performed analysis. This may lead to a higher awareness of the importance of a proper hand hygiene and a higher motivation for using the dispensing systems 54 throughout the staff of the hospital.

Based on the created usage patterns with respect to an exchange of empty containers 56 and the detailed analysis of the use of hand hygiene products throughout specific groups of persons as described above, forecasts concerning the usage of the dispensing systems 54 may be created. According to the derived usage behaviour, a healthcare monitoring system may predict a specific point in time at which a respective container 56 of a dispensing system 54 may be empty. Based on the analysed usage behaviour with respect to professional groups, a healthcare monitoring system may predict the number of necessary dispensing events per day and/or per professional group. Individual daily goals per person and/or per professional group may be derived.

Based on the predicted point in time, maintenance personnel may be instructed to check whether the container 56 expected to be empty has to be exchanged. This may prevent empty containers. Furthermore, the healthcare workers may be incited to fulfil their personal daily goals, leading to an increase in the usage of hand hygiene products.

While exemplary realisations of a sensor module and a system comprising same have been described, it will be understood that the sensor module and the system can be modified in many ways. Therefore, the present disclosure is only limited by the claims appended hereto.

The invention claimed is:

1. A dispensing system for a hand hygiene product comprising:
   a container having a bottom and a dispensing opening located opposite to the bottom;
   a re-usable sensor module comprising:
      an elastically deformable capsule with a top portion for placing the bottom of the container thereon;
      a first sensor arranged within the capsule and configured to measure a parameter associated with an elastic deformation of the capsule resulting from actuation of the dispensing system or presence of the container; and
      a processor arranged within the capsule and coupled to the first sensor, wherein the processor is configured to at least temporarily record at least one of the parameter and an event associated therewith,
      wherein the top portion of the sensor module is made from an elastically deformable material, wherein the top portion of the capsule is dome-shaped and made to deform under a force and return to an initial undeformed state after the force is removed, wherein the top portion comprises a mechanic link in the form of a protrusion extending from an inner surface of the top portion towards the first sensor, and wherein the top portion is configured to be in contact or to be brought into contact with the first sensor via the mechanic link.

2. The dispensing system according to claim 1, wherein the sensor module further comprises a fastening member configured to detachably fasten the sensor module to the container and a holder for the container.

3. The dispensing system according to claim 2, wherein the fastening member is detachable from the sensor module.

4. The dispensing system according to claim 1, wherein the mechanic link is configured to move towards the first sensor when the top portion is elastically deformed.

5. The dispensing system according to claim 1, wherein the first sensor is a force sensor.

6. The dispensing system according to claim 1, wherein the parameter is representative of a weight of the container and/or wherein the event is representative of an actuation of the dispensing system.

7. The dispensing system according to claim 6, wherein the processor is configured to determine, based on at least one of the parameter and the event at least one of a current filling level of the container and an exchange of the container.

8. The dispensing system according to claim 1, wherein the processor is configured to repeatedly acquire the parameter at predefined points in time and/or at configured thresholds; and/or
wherein the processor is coupled to a light-emitting element.

9. The dispensing system according to claim 1, wherein the sensor module comprises a second sensor configured to detect at least one of a movement and a position of the sensor module.

10. The dispensing system according to claim 1, wherein the sensor module further comprises a third sensor, wherein the third sensor is an optical sensor configured to detect at least one of a current filling level of the container and an exchange of the container.

11. The dispensing system according to claim 1, wherein the sensor module further comprises a radio transmitter configured to transmit at least one of the parameter and the event associated therewith to a base station.

12. The dispensing system according claim 1, further comprising:
a holder configured to accommodate the container with the sensor module being sandwiched between the holder and the bottom of the container.

13. The dispensing system according claim 12, wherein the sensor module is detachably mounted to the holder by a fastening member.

14. The dispensing system according to claim 13, wherein the fastening member is detachable from the sensor module.

15. The dispensing system according to claim 1, further comprising
a fluid dispenser for a hand hygiene product, the fluid dispenser comprising the container and a manually actuatable pump, wherein the fluid dispenser is configured so that an actuation of the pump produces a force on the top portion of the sensor module in addition to a weight of the container;
wherein the first sensor is configured to measure a parameter associated with an elastic deformation of the capsule resulting from the actuation of the pump.

16. A method of operating a re-usable sensor module for use with a dispenser for a hand hygiene product having a container, the sensor module comprising an elastically deformable capsule with a top portion, wherein the top portion of the capsule is dome-shaped and made to deform under a force and return to an initial undeformed state after the force is removed, wherein the top portion comprises a mechanic link in the form of a protrusion extending from an inner surface of the top portion towards a first sensor arranged within the capsule, and wherein the top portion is configured to be in contact or to be brought into contact with the first sensor via the mechanic link, the method comprising:
placing a bottom of the container on the top portion of the deformable capsule;
measuring by the first sensor a parameter associated with an elastic deformation of the capsule resulting from actuation of the dispenser or presence of the container; and
at least temporarily recording by a processor at least one of the parameter and an event associated therewith.

17. The method according to claim 16, wherein
the parameter comprises one or more of a voltage indicative of a presence of the container, a peak voltage associated with actuation of the dispenser, and a duration of actuation of the dispenser.

18. A computer program product configured to perform the steps of claim 16 when executed by a processor.

19. The dispensing system according to claim 1, wherein the first sensor is a pressure sensor.

20. The dispensing system according to claim 1, wherein the first sensor is a mechanical switch.

* * * * *